(12) United States Patent
Yamamoto et al.

(10) Patent No.: US 8,194,795 B2
(45) Date of Patent: Jun. 5, 2012

(54) DIGITAL BROADCAST RECEPTION DEVICE

(75) Inventors: Kohsuke Yamamoto, Osaka (JP);
Keiichi Toiyama, Osaka (JP)

(73) Assignee: Panasonic Corporation, Osaka (JP)

( * ) Notice: Subject to any disclaimer, the term of this patent is extended or adjusted under 35 U.S.C. 154(b) by 860 days.

(21) Appl. No.: 12/159,240

(22) PCT Filed: May 17, 2007

(86) PCT No.: PCT/JP2007/060114
§ 371 (c)(1),
(2), (4) Date: Jun. 26, 2008

(87) PCT Pub. No.: WO2007/135942
PCT Pub. Date: Nov. 29, 2007

(65) Prior Publication Data
US 2010/0220818 A1     Sep. 2, 2010

(30) Foreign Application Priority Data
May 18, 2006   (JP) ................................. 2006-138450

(51) Int. Cl.
*H04L 27/06* (2006.01)
(52) U.S. Cl. ........ 375/340; 375/260; 375/316; 375/329; 375/346; 375/349; 455/504; 455/506
(58) Field of Classification Search ................. 375/136, 375/140, 147, 260, 267, 271, 316, 322, 329, 375/40, 344, 346, 349
See application file for complete search history.

(56) References Cited

U.S. PATENT DOCUMENTS

| | | | | |
|---|---|---|---|---|
| 7,031,725 | B2 * | 4/2006 | Rorabaugh | 455/456.1 |
| 7,286,601 | B2 * | 10/2007 | Kitamura | 375/259 |
| 7,580,612 | B2 * | 8/2009 | Sato et al. | 386/270 |
| 7,933,460 | B2 * | 4/2011 | Owada | 382/240 |
| 7,989,775 | B2 * | 8/2011 | Allen et al. | 250/393 |
| 8,000,400 | B2 * | 8/2011 | Yoshida et al. | 375/260 |
| 8,010,049 | B2 * | 8/2011 | Kawasaki | 455/62 |
| 2004/0198229 | A1 | 10/2004 | Hirata | |
| 2005/0266903 | A1 | 12/2005 | Masaki | |
| 2009/0190668 | A1 * | 7/2009 | Tomobe et al. | 375/240.25 |
| 2011/0080302 | A1 * | 4/2011 | Muthaiah et al. | 340/903 |

FOREIGN PATENT DOCUMENTS
JP     07-015380     1/1995
(Continued)

OTHER PUBLICATIONS

International Search Report for PCT/JP2007/060114, dated Aug. 28, 2007.

*Primary Examiner* — Hirdepal Singh
(74) *Attorney, Agent, or Firm* — RatnerPrestia

(57) ABSTRACT

A digital broadcast reception device mounted on a mobile body includes a position information detection unit for detecting the position of the digital broadcast reception device, a database holding unit for storing reception quality of the digital broadcast in advance, a switching point calculation unit for obtaining a hierarchy switching point, and output switching unit for performing a hierarchy switching. The digital broadcast reception device acquires the hierarchy switching frequency generated during movement in advance based on reception quality information previously stored in the database holding unit, and controls the hierarchy switching so as to reduce the switching frequency, thereby reducing disconnections of video and audio.

18 Claims, 20 Drawing Sheets

FOREIGN PATENT DOCUMENTS

| | | |
|---|---|---|
| JP | 2004-282476 A | 10/2004 |
| JP | 2005-184219 A | 7/2005 |
| JP | 2005-223549 A | 8/2005 |
| JP | 2005-277873 A | 10/2005 |
| JP | 2005-286918 A | 10/2005 |
| JP | 2005-341265 A | 12/2005 |
| JP | 2006-174209 A | 6/2006 |

* cited by examiner

FIG. 2

| Latitude \ Longitude | 135°35'05" east longitude | 135°35'10" east longitude | 135°35'15" east longitude | 135°35'20" east longitude | 135°35'25" east longitude | 135°35'30" east longitude |
|---|---|---|---|---|---|---|
| 34°44'00" north latitude | ○ | ○ | ○ | ○ | ○ | ○ |
| 34°43'55" north latitude | × | ○ | ○ | ○ | ○ | ○ |
| 34°43'50" north latitude | × | ○ | × | ○ | ○ | ○ |
| 34°43'45" north latitude | × | ○ | × | × | ○ | ○ |
| 34°43'40" north latitude | ○ | × | × | × | ○ | ○ |
| 34°43'35" north latitude | ○ | × | × | × | ○ | ○ |
| 34°43'30" north latitude | ○ | ○ | ○ | × | ○ | ○ |
| 34°43'25" north latitude | ○ | ○ | ○ | ○ | ○ | ○ |
| 34°43'20" north latitude | ○ | ○ | ○ | ○ | ○ | ○ |
| 34°43'15" north latitude | ○ | ○ | ○ | ○ | ○ | ○ |

FIG. 5
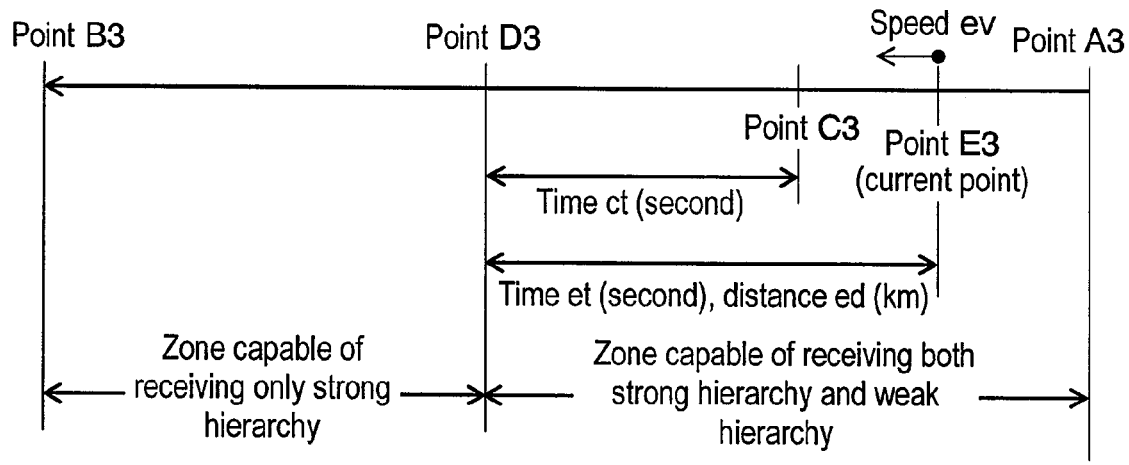
FIG. 6
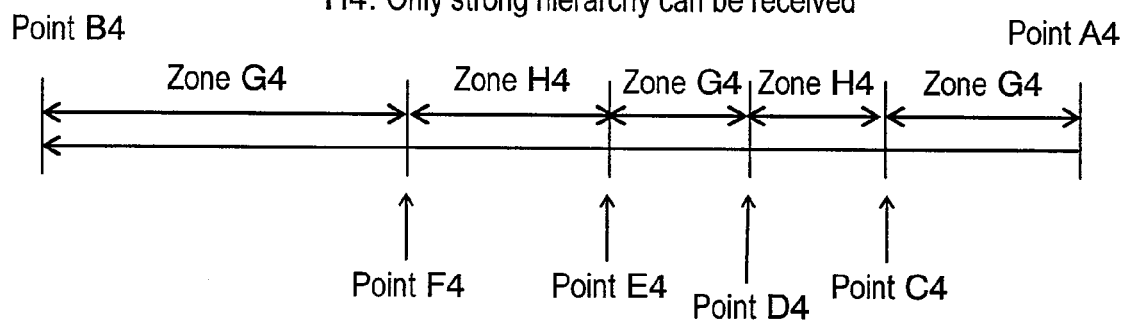
FIG. 7
|  | Movement speed | | | |
|---|---|---|---|---|
|  | 40km/h | 60km/h | 80km/h | 100km/h |
| Reception quality | ○ | ○ | × | × |

FIG. 8

| Latitude \ Longitude | 135° 35'05" east longitude | 135° 35'10" east longitude | 135° 35'15" east longitude | 135° 35'20" east longitude | 135° 35'25" east longitude | 135° 35'30" east longitude |
|---|---|---|---|---|---|---|
| 34°44'00" north latitude | ○○ ○○ | ○○ ○○ | ○○ ○× | ○○ ○○ | ○○ ○○ | ○○ ○○ |
| 34°43'55" north latitude | ○○ ○× | ○○ ○× | ○○ ×× | ○○ ○× | ○○ ○○ | ○○ ○○ |
| 34°43'50" north latitude | ○○ ○× | ○○ ○× | ○× ×× | ○○ ○× | ○○ ○× | ○○ ○○ |
| 34°43'45" north latitude | ○○ ×× | ○× ×× | ×× ×× | ○○ ○× | ○○ ○× | ○○ ○○ |
| 34°43'40" north latitude | ○○ ×× | ×× ×× | ○× ×× | ○○ ×× | ○○ ○× | ○○ ○○ |
| 34°43'35" north latitude | ○○ ○× | ○○ ×× | ○○ ○× | ○○ ×× | ○○ ○× | ○○ ○○ |
| 34°43'30" north latitude | ○○ ○× | ○○ ×× | ○○ ○× | ○○ ×× | ○○ ×× | ○○ ○× |
| 34°43'25" north latitude | ○○ ○× | ○○ ○× | ○○ ○× | ○○ ×× | ○○ ○× | ○○ ○× |
| 34°43'20" north latitude | ○○ ○○ | ○○ ○× | ○○ ○○ | ○○ ×× | ○○ ○× | ○○ ○× |
| 34°43'15" north latitude | ○○ ○○ | ○○ ○○ | ○○ ○○ | ○○ ○× | ○○ ○× | ○○ ○○ |

FIG. 11

| Latitude \ Longitude | 135°35" 05' east longitude | 135°35" 10' east longitude | 135°35" 15' east longitude | 135°35" 20' east longitude | 135°35" 25' east longitude | 135°35" 30' east longitude |
|---|---|---|---|---|---|---|
| 34°44" 00' north latitude | O O<br>O O | O O<br>O x | O O<br>O x | O O<br>O O | O O<br>O O | O O<br>O O |
| 34°43" 55' north latitude | O O<br>O x | O O<br>O x | O O<br>O x | O O<br>O x | O O<br>O x | O O<br>O O |
| 34°43" 50' north latitude | O O<br>O x | O O<br>O x | O x<br>x x | O O<br>O x | O O<br>O x | O O<br>O O |
| 34°43" 45' north latitude | O O<br>x x | O x<br>x x | x x<br>x x | O O<br>x x | O O<br>x O | O O<br>O O |
| 34°43" 40' north latitude | O O<br>x x | O O<br>x x | O x<br>x x | O O<br>x x | O O<br>O x | O O<br>O O |
| 34°43" 35' north latitude | O O<br>O x | O O<br>x x | O O<br>x x | O O<br>x x | O O<br>O x | O O<br>O x |
| 34°43" 30' north latitude | O O<br>O x | O O<br>x x | O O<br>O x | O O<br>x x | O O<br>x x | O O<br>O x |
| 34°43" 25' north latitude | O O<br>O x | O O<br>x x | O O<br>O x | O O<br>x x | O O<br>O x | O O<br>O x |
| 34°43" 20' north latitude | O O<br>O O | O O<br>x x | O O<br>O x | O O<br>x x | O O<br>O x | O O<br>O x |
| 34°43" 15' north latitude | O O<br>O O | O O<br>O O | O O<br>O O | O O<br>O x | O O<br>O x | O O<br>O O |

FIG. 14

| | Longitude | | | | | |
|---|---|---|---|---|---|---|
| | 135°35" 05' east longitude | 135°35" 10' east longitude | 135°35" 15' east longitude | 135°35" 20' east longitude | 135°35" 25' east longitude | 135°35" 30' east longitude |
| 34°44" 00' north latitude | ○ | ○ | ○ | ○ | ○ | ○ |
| 34°43" 55' north latitude | × | ○ | ○ | ○ | ○ | ○ |
| 34°43" 50' north latitude | × | ○ | × | ○ | ○ | ○ |
| 34°43" 45' north latitude | × | ○ | × | × | ○ | ○ |
| 34°43" 40' north latitude | ○ | × | × | × | ○ | ○ |
| 34°43" 35' north latitude | ○ | × | × | × | ○ | ○ |
| 34°43" 30' north latitude | ○ | ○ | ○ | × | ○ | ○ |
| 34°43" 25' north latitude | ○ | ○ | ○ | ○ | ○ | ○ |
| 34°43" 20' north latitude | ○ | ○ | ○ | ○ | ○ | ○ |
| 34°43" 15' north latitude | ○ | ○ | ○ | ○ | ○ | ○ |

Latitude

FIG. 17
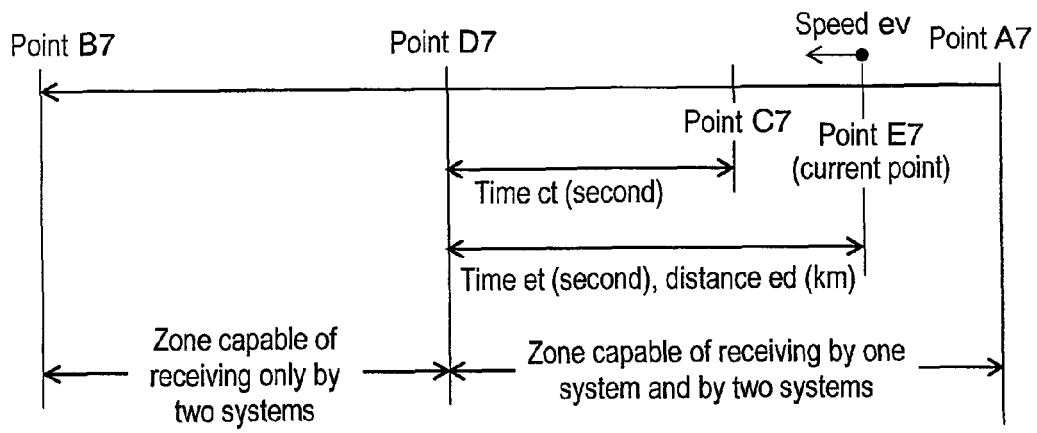
FIG. 18
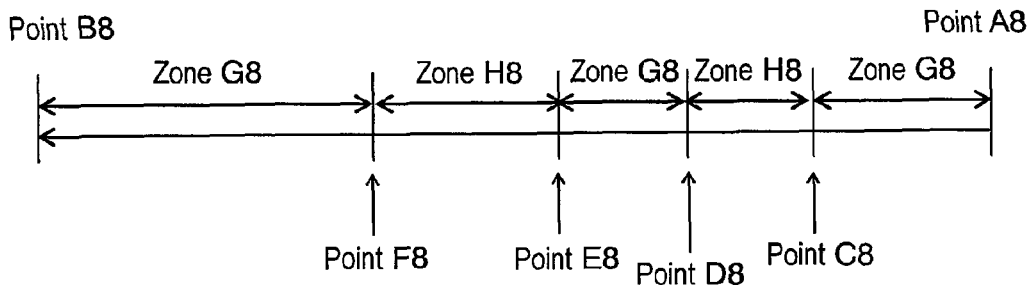
FIG. 19
|  | Movement speed | | | |
|---|---|---|---|---|
|  | 40km/h | 60km/h | 80km/h | 100km/h |
| Reception quality | O | O | × | × |

FIG. 20

| | Longitude | | | | | | |
|---|---|---|---|---|---|---|---|
| | 135°35" 05' east longitude | 135°35" 10' east longitude | 135°35" 15' east longitude | 135°35" 20' east longitude | 135°35" 25' east longitude | 135°35" 30' east longitude | |
| 34°44" 00' north latitude | O O<br>O O | O O<br>O x | O O<br>O O | O O<br>O O | O O<br>O O | O O<br>O O | |
| 34°43" 55' north latitude | O O<br>O x | O O<br>O x | O O<br>O x | O O<br>O x | O O<br>O x | O O<br>O O | |
| 34°43" 50' north latitude | O O<br>O x | O O<br>O x | O O<br>x x | O O<br>O x | O O<br>O x | O O<br>O O | |
| 34°43" 45' north latitude | O O<br>x x | O x<br>x x | O x<br>x x | O O<br>x x | O O<br>O x | O O<br>O O | |
| 34°43" 40' north latitude | O O<br>x x | O O<br>x x | x x<br>x x | O O<br>x x | O O<br>O x | O O<br>O O | |
| 34°43" 35' north latitude | O O<br>O x | O O<br>x x | O O<br>x x | O O<br>x x | O O<br>O x | O O<br>O x | |
| 34°43" 30' north latitude | O O<br>O x | O O<br>x x | O O<br>x x | O O<br>x x | O O<br>O x | O O<br>O x | |
| 34°43" 25' north latitude | O O<br>O O | O O<br>x x | O O<br>O x | O O<br>x x | O O<br>x x | O O<br>O x | |
| 34°43" 20' north latitude | O O<br>O O | O O<br>O O | O O<br>O O | O O<br>O x | O O<br>O x | O O<br>O x | |
| 34°43" 15' north latitude | O O<br>O O | O O<br>O O | O O<br>O O | O O<br>O x | O O<br>O x | O O<br>O O | |

Latitude

FIG. 23

| | Longitude | | | | | |
|---|---|---|---|---|---|---|
| | 135°35" 05' east longitude | 135°35" 10' east longitude | 135°35" 15' east longitude | 135°35" 20' east longitude | 135°35" 25' east longitude | 135°35" 30' east longitude |
| 34°44" 00' north latitude | ○ ○<br>○ ○ | ○ ○<br>○ × | ○ ○<br>○ ○ | ○ ○<br>○ ○ | ○ ○<br>○ ○ | ○ ○<br>○ ○ |
| 34°43" 55' north latitude | ○ ○<br>○ × | ○ ○<br>○ × | ○ ○<br>○ × | ○ ○<br>○ × | ○ ○<br>○ × | ○ ○<br>○ ○ |
| 34°43" 50' north latitude | ○ ○<br>○ × | ○ ○<br>○ × | ○ ×<br>× × | ○ ○<br>○ × | ○ ○<br>○ × | ○ ○<br>○ ○ |
| 34°43" 45' north latitude | ○ ○<br>× × | ○ ×<br>× × | × ×<br>× × | ○ ○<br>× × | ○ ○<br>× ○ | ○ ○<br>○ ○ |
| 34°43" 40' north latitude | ○ ○<br>× × | ○ ○<br>× × | ○ ×<br>× × | ○ ○<br>× × | ○ ○<br>○ × | ○ ○<br>○ ○ |
| 34°43" 35' north latitude | ○ ○<br>○ × | ○ ○<br>× × | ○ ○<br>○ × | ○ ○<br>× × | ○ ○<br>○ × | ○ ○<br>○ ○ |
| 34°43" 30' north latitude | ○ ○<br>○ × | ○ ○<br>× × | ○ ○<br>○ × | ○ ○<br>× × | ○ ○<br>○ × | ○ ○<br>○ × |
| 34°43" 25' north latitude | ○ ○<br>○ ○ | ○ ○<br>× × | ○ ○<br>○ × | ○ ○<br>× × | ○ ○<br>× × | ○ ○<br>○ × |
| 34°43" 20' north latitude | ○ ○<br>○ ○ | ○ ○<br>× × | ○ ○<br>○ × | × ×<br>× × | ○ ○<br>○ × | ○ ○<br>○ × |
| 34°43" 15' north latitude | ○ ○<br>○ ○ | ○ ○<br>○ ○ | ○ ○<br>○ ○ | ○ ○<br>○ × | ○ ○<br>○ × | ○ ○<br>○ ○ |

Latitude

DIGITAL BROADCAST RECEPTION DEVICE

This application is a U.S. National Phase Application of PCT International Application PCT/JP2007/060114.

TECHNICAL FIELD

The present invention relates to a mobile digital broadcast reception device. More particularly, it relates to a technology for calculating a reception situation during movement in advance and switching a hierarchy to be received.

BACKGROUND ART

In terrestrial digital broadcast1services, a transmission band of one physical channel is divided into 13 segments for example. Therefore, signals of different modulation formats can be multiplexed in one physical channel. For example, 12 segments of 13 segments are transmitted in a 64QAM modulation format for fixed reception, and at the same time, one segment is transmitted in a QPSK modulation format for mobile reception. Therefore, it is possible to select a hierarchy to be received in accordance with a reception environment and a receiving terminal at the side of the receiving terminal. For example, in the 64QAM modulation format for fixed reception, since an information transmission rate is large, high-definition broadcast can be carried out. However, in the 64QAM modulation format, robustness to a change of a transmission path is weak and reception is difficult in a weak electric field. Therefore, reception is difficult in a harsh reception environment such as reception in a mobile body. On the other hand, in the QPSK modulation format for a mobile body, since an information transmission rate is small, QVGA using H264 compression, picture of about 15 fps, is transmitted. The picture quality is not so high. However, in the QPSK modulation format for a mobile body, a resistance to a change of a transmission path is high and reception can be carried out well even in a weak electric field. Therefore, the QPSK modulation format is thought to be used in, for example, a portable terminal or a vehicle-mounted receiving device. A hierarchy such as a hierarchy of 64QAM, in which robustness to a change of a transmission path is weak and reception is difficult in a weak electric field, is referred to as a weak hierarchy. A hierarchy such as a hierarchy of QPSK, in which a resistance to a change of a transmission path is strong and reception can be carried out even in a weak electric field, is referred to as a strong hierarchy.

In currently used digital broadcast reception devices for mobile bodies, in order to prevent disconnections of video and audio, the following measures are employed. That is to say, a reception state is determined based on values such as an electric field strength of a received broadcast signal, a block noise, BER (Bit Error Rate), and the like. Then, an optimum hierarchy is selected and received in accordance with the change of the reception state. This is referred to as a hierarchy switching. In this way, a digital broadcast reception method, in which a hierarchy is selected in accordance with the reception state by carrying out hierarchy switching, has been proposed.

FIG. 26 is a block diagram showing a configuration of a conventional vehicle-mounted digital broadcast reception device (hereinafter, abbreviated to "a vehicle-mounted receiving device") (see, for example, patent document 1). Vehicle-mounted reception device 1100 shown in FIG. 26 includes antenna 1101, tuner 1102 for receiving a radio wave, and demodulator 1103 for demodulating the radio wave received by tuner 1102 into a digital signal. Furthermore, vehicle-mounted reception device 1100 includes TS (Transport Stream) processing device 1104 for separating various data included in the digital signal from the digital signal, decoder 1105 for converting the digital data from TS processing device 1104 into data such as video, audio and other data, and setting device 1108 for receiving an input necessary for operating vehicle-mounted reception device 1100. Furthermore, vehicle-mounted reception device 1100 includes selection device 1106 for taking into a predetermined signal output from tuner 1102 and the like, and selecting and outputting one of a plurality of display candidates included in the received signal; and outputting device 1107 for outputting multimedia data such as video and audio data, and the like, based on the data output from selection device 1106. Furthermore, vehicle-mounted reception device 1100 includes I/O device 1109 for receiving various input data of vehicle-mounted reception device 1100, ROM device 1110 and RAM device 1111 for storing a program necessary to start vehicle-mounted reception device 1100 and data, recording device 1112 for storing data necessary during operation of vehicle-mounted reception device 1100, and CPU 1113 for operating vehicle-mounted reception device 1100. The above-mentioned component elements are connected with bus 1161.

Furthermore, the below-mentioned signals are sent/received through connection lines 1152 to 1160 shown in the drawing, respectively. A RF (Radio Frequency) signal is transmitted through connection line 1152; and a digital data (for example, a transport stream) signal is transmitted through connection line 1153. Then, a digital data (for example, an elementary stream) signal is transmitted through connection lines 1154 and 1155. A video signal such as VGA (Video Graphics Array), NTSC (National Television Standards Committee), and PAL (Phase Alternation by Line), an audio signal such as AAC (Advanced Audio Coding), other signals such as a signal relating to text data, and the like, are transmitted through connection line 1156. Furthermore, a signal relating to an electric field strength showing the reception strength of the radio wave received by tuner 1102 is transmitted through connection line 1157. Then, a signal relating to BER (Bit Error Rate) showing a reception situation of data that have been demodulated into digital data is transmitted through connection line 1158. Furthermore, a digital signal for inputting or changing the display condition with respect to outputting device 1107 is transmitted through connection line 1159. A signal relating to an index showing a quality of video (for example, a block noise generation rate, a value of the total amount of motion vector, a disconnection degree of audio) is transmitted through connection line 1160.

However, since such a method carries out a hierarchy switching after it determines values such as an electric field strength, a block noise, and BER, it cannot respond to a rapid change of a reception environment, so that video and audio having a poor reception quality may be displayed before hierarchy stitching is carried out. In addition, during movement on a route whose reception environment is changed relatively drastically, hierarchy switching occurs frequently, which may make a user feel uncomfortable. In order to solve this problem, from the receivable area information, fixing to a strong hierarchy area for a while has been proposed in order to prevent excessive generation of switching before a hierarchy switching is performed frequently based on position information of a mobile body and receivable area information (see, for example, patent document 2).

As mentioned above, in the digital broadcast reception device in which the receiving hierarchy is switched in accordance with receiving states, since disconnections of video and audio occur for several seconds during switching of the receiving hierarchies, it is desirable that a switching frequency is reduced as much as possible. Thus, in a conventional digital broadcast reception device, in order to prevent too frequent switching, a technique for fixing broadcast to simple moving picture broadcast has been employed. However, since an appropriate switching holding time is different depending upon a running position and a receiving state, it has been difficult to constantly perform appropriate switching in various reception environments.

Furthermore, in vehicle-mounted digital broadcast reception devices, a diversity technology for individually demodulating and synthesizing input signals from a plurality of antennas is often used. Each system from a plurality of antennas is referred to as a branch. Digital broadcast reception devices having a two-branch configuration and a 4-branch configuration have been developed. The larger the number of branches is, the more the reception quality is improved and the error robustness is increased. Therefore, in a digital broadcast reception device having a plurality of branches, for example, a digital broadcast reception device having four branches, it is thought that three branches are used for receiving video and remaining one branch is used for channel scanning or obtaining programs. However, even in a position in which a satisfactory reception quality cannot be secured unless four branches are used, during processing using one branch in the background, only reception quality corresponding to three branches can be obtained. Even when deterioration of the reception quality is detected and reception can be changed to 4-branch reception, it is not possible to carry out a rapid response to the change of a reception environment.

[Patent Document 1] Japanese Patent Unexamined Publication No. 2005-277873

[Patent Document 2] Japanese Patent Unexamined Publication No. 2005-184219

SUMMARY OF THE INVENTION

A digital broadcast reception device includes a broadcast wave reception antenna for receiving a broadcast signal; a station selection demodulation unit for selecting and demodulating the broadcast signal received by the broadcast wave reception antenna, and distributing and outputting a signal for each hierarchy; and a first decoding unit for decoding one signal of the plurality of demodulated signals output from the station selection demodulation unit. Furthermore, the digital broadcast reception device includes a second decoding unit for decoding another signal of the plurality of demodulated signals output from the station selection demodulation unit; an output switching unit for switching and outputting the signals output from the first decoding unit and the second decoding unit; and a position information detection unit for detecting position information and outputting a position information signal. Furthermore, the digital broadcast reception device includes a movement direction detection unit for detecting a movement direction of the digital broadcast reception device based on the position information signal output from the position information detection unit and outputting a movement direction information signal; and a database holding unit for holding reception quality information in which the position information signal is related to reception quality at a corresponding position. Furthermore, the digital broadcast reception device includes a switching point calculation unit for calculating a hierarchy switching point based on the position information signal output from the position information detection unit, the movement direction information signal output from the movement direction detection unit and the reception quality information stored in the database holding unit, and outputting a switching request signal to the output switching unit. Then, the switching point calculation unit controls the output switching unit based on the reception quality information, the movement direction information signal and the position information signal, thereby controlling so that generation of the hierarchy switching during movement is reduced.

With such a configuration, in the digital broadcast reception device, firstly, the switching point calculation unit calculates a movement route to be predicted by using the position information signal output from the position information detection unit and the movement direction information signal output from the movement direction detection unit; then, reads out reception quality information on the movement route from the database holding unit; and subsequently calculates a hierarchy switching point on the movement route based on the data read out from database holding unit. Then, when the number of the resultant calculated hierarchy switching points is predetermined number or more, in order to reduce the hierarchy switching points, even in a zone capable of receiving a weak hierarchy, reception of a strong hierarchy is carried out, during movement in the corresponding zone.

Furthermore, the digital broadcast reception device includes a plurality of broadcast wave reception antennas for receiving a broadcast signal; station selection demodulation units for selecting and demodulating the broadcast signal received by the broadcast wave reception antennas; and a synthesizing and distributing unit for synthesizing and distributing the plurality of demodulated signals output from the plurality of station selection demodulation units. Furthermore, the digital broadcast reception device includes a first transport decoding unit for transport decoding one signal of the plurality of distributed signals output from the synthesizing and distributing unit; a second transport decoding unit for transport decoding one signal of the plurality of distributed signals output from the synthesizing and distributing unit; and an AV decoding unit for decoding the transport decoded signal output from the first transport decoding unit.

Furthermore, the digital broadcast reception device includes a reference position information reception antenna for receiving a reference position information signal; a position information detection unit for outputting a position information signal based on the reference position information signal received by the reference position information reception antenna; a movement direction detection unit for detecting a movement direction of the digital broadcast reception device based on the position information signal output from the position information detection unit and outputting a movement direction information signal; and a database holding unit for holding reception quality information in which the position information signal is related to reception quality in the corresponding position. Furthermore, the digital broadcast reception device includes a switching unit for controlling a synthesizing and distributing method by the synthesizing and distributing unit based on the position information signal output from the position information detection unit, the movement direction information signal output from the movement direction detection unit, and the reception quality information stored in the database holding unit. Then, by using the plurality of station selection demodulation units, background processing, for example, selecting a physical channel other than those for viewing and listening, is carried out.

With such a configuration, the digital broadcast reception device can carry out a diversity synthesis by using the plurality of broadcast wave reception antennas and station selection demodulation units. The plurality of station selection demodulation units can select different physical channels, and thereby channel scanning and obtaining other programs of other channels can be carried out. Then, the switching unit firstly calculates a movement route to be predicted by using the position information signal output from the position information detection unit and the movement direction information signal output from the movement direction detection unit; and then, reads out the reception quality information on the calculated movement route from the database holding unit. In a zone on the movement route in which an excellent reception can be carried out by using one broadcast wave reception antenna and one station selection demodulation unit, background processing is carried out by using another broadcast wave reception antenna and another station selection demodulation unit. Furthermore, before reaching a zone in which excellent reception cannot be carried out by one broadcast wave reception antenna and one station selection demodulation unit, the background processing is stopped and both broadcast wave reception antennas and station selection demodulation units are used for viewing and listening so as to secure the reception quality. In other words, by carrying out antenna switching between one system of received signal composed of one broadcast wave reception antenna and one station selection demodulation unit and a plurality of systems of received signals composed of a plurality of broadcast wave reception antennas and a plurality of station selection demodulation units, the reception quality is secured.

Furthermore, an antenna switching point on the movement route is calculated based on the data read out from the database holding unit, and when the calculated number of the hierarchy switching points is a predetermined number or more, in order to reduce the antenna switching points, even in a zone in which one-system reception can be carried out, two-system reception is carried out during movement of the corresponding zone.

Therefore, it is possible to realize a digital broadcast reception device in which when digital broadcast is received during movement, antenna switching points are predicted and the number of antenna switching points is reduced, thereby reducing disconnections of video and audio.

Furthermore, it is possible to realize a digital broadcast reception device in which when digital broadcast is received during movement, the digital reception device can perform a necessary background processing without deteriorating the reception quality of the channel for viewing and listening.

BRIEF DESCRIPTION OF THE DRAWINGS

FIG. 2 is a data configuration table showing an example of reception quality information at each point in a grid held in a database holding unit in accordance with the first exemplary embodiment of the present invention.

FIG. 5 is a data schematic view showing an example of calculating hierarchy switching points by a switching point calculation unit in accordance with the first exemplary embodiment of the present invention.

FIG. 6 is a data schematic view showing an example of calculating hierarchy switching points by a switching point calculation unit in accordance with the first exemplary embodiment of the present invention.

FIG. 7 is a data configuration table showing an example of reception quality information extracted at one point held in a database holding unit in accordance with the first exemplary embodiment of the present invention.

FIG. 8 is a data configuration table showing an example of reception quality information extracted at a plurality of points held in a database holding unit in accordance with the first exemplary embodiment of the present invention.

FIG. 11 is a data configuration table showing an example of reception quality information extracted at a plurality of points held in a database holding unit in accordance with the first exemplary embodiment of the present invention.

FIG. 14 is a data configuration table showing an example of reception quality information at each point in a grid held in a database holding unit in accordance with the second exemplary embodiment of the present invention.

FIG. 17 is a data schematic view showing an example of calculating an antenna switching point by a control unit in accordance with the second exemplary embodiment of the present invention.

FIG. 18 is a data schematic view showing an example of calculating an antenna switching point by a control unit in accordance with the second exemplary embodiment of the present invention.

FIG. 19 is a data configuration table showing an example of reception quality information extracted at one point held in a database holding unit in accordance with the second exemplary embodiment of the present invention.

FIG. 20 is a data configuration table showing an example of reception quality information extracted at a plurality of points held in a database holding unit in accordance with the second exemplary embodiment of the present invention.

FIG. 23 is a data configuration table showing an example of reception quality information extracted at a plurality of points held in a database holding unit in accordance with the second exemplary embodiment of the present invention.

Figure 1:
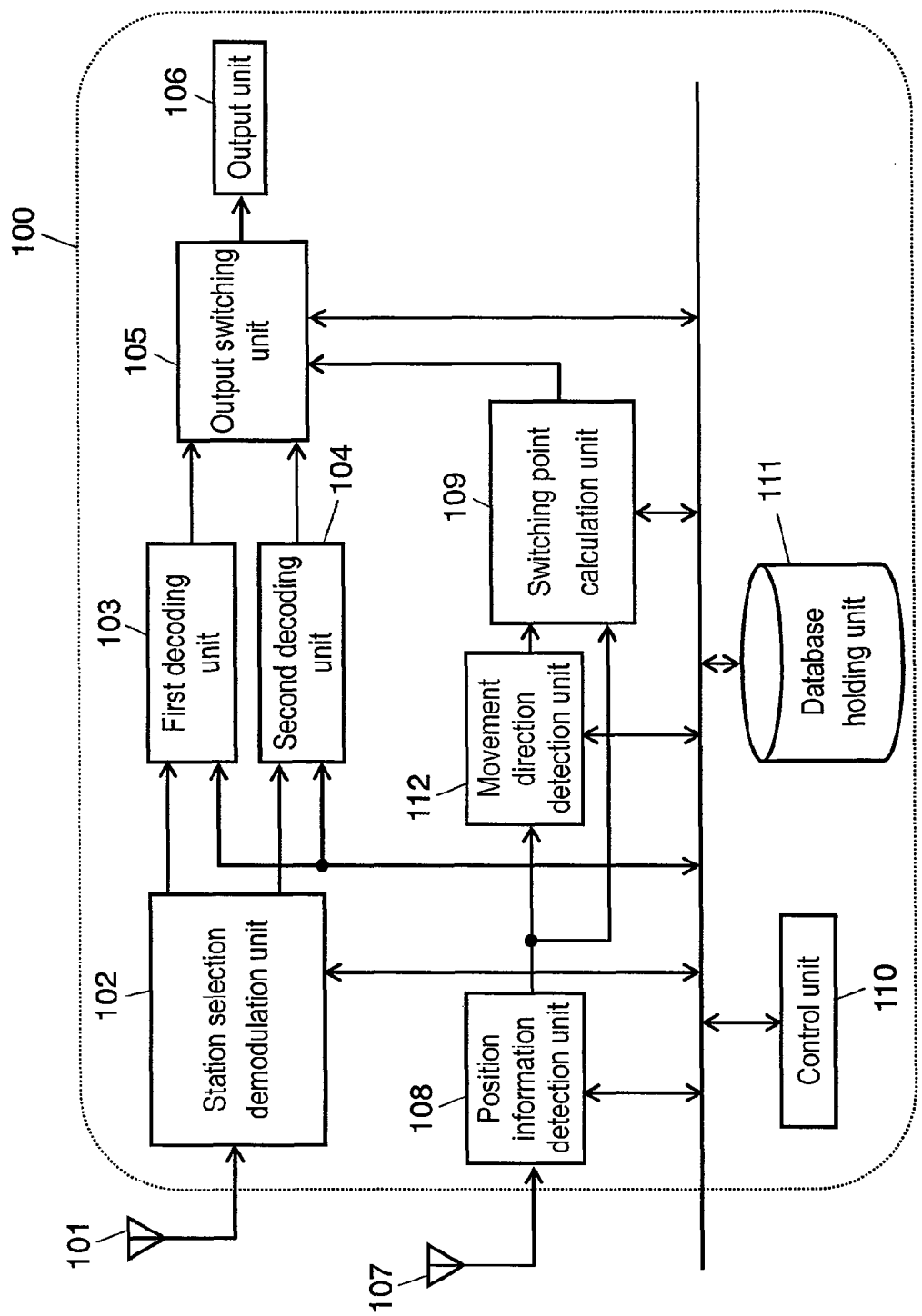
FIG. 1 is a block diagram showing a configuration of a digital broadcast reception device in accordance with a first exemplary embodiment of the present invention.

REFERENCE MARKS IN THE DRAWINGS 100, 200 digital broadcast reception device
101, 201 first antenna (broadcast wave reception antenna)
102, 202, 204 station selection demodulation unit
103 first decoding unit
104 second decoding unit
105 output switching unit
106, 209 output unit
107, 210 second antenna (reference position information reception antenna)
108, 211 position information detection unit
109 switching point calculation unit
110, 215 control unit
111 database holding unit
112 movement direction detection unit
203 third antenna (broadcast wave reception antenna)
205 synthesizing and distributing unit
206 first transport decoding unit
207 second transport decoding unit
208 AV decoding unit
212 movement direction detection unit
213 switching unit
214 database holding unit
300, 301, 302 tunnel
700 synthesizing unit
701 switch
702 first input terminal
703 second input terminal
704 first output terminal
705 second output terminal
706 control request input terminal

DETAILED DESCRIPTION OF THE PREFERRED EMBODIMENTS

Hereinafter, exemplary embodiments of the present invention are described with reference to drawings. Note here that the present invention is not limited to the digital broadcast reception device of this example and can be similarly used for other reception device including wireless communication.

Furthermore, a digital receiving device in accordance with the present invention, for example, ISDB-T (Terrestrial Integrated Services Digital Broadcasting) system that is a broadcast system in terrestrial digital broadcast services in Japan, is a receiving device that receives a broadcast wave in which hierarchies composed of a plurality of segments are simultaneously transmitted.

First Exemplary Embodiment

FIG. 1 is a block diagram showing a configuration of digital broadcast reception device 100 in this exemplary embodiment. Digital broadcast reception device 100 shown in FIG. 1 includes first antenna 101 as a broadcast wave reception antenna, station selection demodulation unit 102, first decoding unit 103, second decoding unit 104, output switching unit 105 and output unit 106. Furthermore, digital broadcast reception device 100 includes second antenna 107 as a reference position information reception antenna, position information detection unit 108, movement direction detection unit 112, switching point calculation unit 109, control unit 110, and database holding unit 111.

Station selection demodulation unit 102 receives an input of an RF signal output from first antenna 101 including a UHF reception antenna and the like, which receives a terrestrial digital broadcast wave by digital broadcast services such as terrestrial digital broadcast services; and selects and demodulates one channel from the RF signal. Furthermore, station selection demodulation unit 102 separates TS signals obtained by demodulation processing into a TS signal for a weak hierarchy and a TS signal for a strong hierarchy. Then, station selection demodulation unit 102 outputs the TS signal for a weak hierarchy to first decoding unit 103, and outputs the TS signal for a strong hierarchy to second decoding unit 104.

First decoding unit 103 decodes the input TS signal for a weak hierarchy and outputs a video signal and an audio signal to output switching unit 105. At the same time, second decoding unit 104 decodes the input TS signal for a strong hierarchy and outputs a video signal and an audio signal to output switching unit 105.

Second antenna 107 receives a reference position information signal including position information of digital broadcast reception device 100, and outputs it to position information detection unit 108. Then, position information detection unit 108 receives an input of the reference position information signal received by second antenna 107, detects position information based on the reference position information signal, and outputs a position information signal to switching point calculation unit 109 and movement direction detection unit 112. Note here that second antenna 107 and position information detection unit 108 may use a reception unit in a GPS reception system. Furthermore, they are not particularly limited as long as they can detect position information, and for example, a reception unit for a communication system such as PHS can be used.

Database holding unit 111 holds reception quality information related to the position information. Movement direction detection unit 112 detects the movement direction of digital broadcast reception device 100 based on the position information signal output from position information detection unit 108.

Switching point calculation unit 109 predicts a movement route of digital broadcast reception device 100 based on the position information signal output from position information detection unit 108 and the movement direction information signal output from movement direction detection unit 112. Next, switching point calculation unit 109 reads out the reception quality information on the movement route from database holding unit 111. Then, switching point calculation unit 109 carries out calculation based on the read-out reception quality information in order to set a hierarchy switching point in the front of a point where a reception error occurs and a hierarchy has to be switched. Then, when digital broadcast reception device 100 moves to the calculated hierarchy switching point, switching point calculation unit 109 outputs a hierarchy switching request signal to output switching unit 105. A method for calculating the hierarchy switching point is described later in detail.

Output switching unit 105 selects whether receiving a weak hierarchy or receiving a strong hierarchy based on the hierarchy switching request signal from switching point calculation unit 109, and switches hierarchy to be received. Then, output switching unit 105 outputs a video signal and an audio signal of the selected hierarchy to output unit 106. Output unit 106 outputs the video signal and the audio signal output from output switching unit 105 to the outside of digital broadcast reception device 100. Furthermore, control unit 110 controls and monitors entire digital broadcast reception device 100.

Next, FIG. 2 shows an extracted example the reception quality information held in database holding unit 111. The data show sampling of the reception quality at each point in a grid by using longitude and latitude information. In the drawing, a part denoted by "o" shows a zone capable of receiving both a weak hierarchy and a strong hierarchy, and a part denoted by "x" shows a zone capable of receiving only a strong hierarchy. For example, in the movement from a location at 135 degrees, 35 minutes, 30 seconds east longitude (hereinafter, referred to as 135° 35" 30' east longitude) and 34 degrees, 43 minutes, 30 seconds north latitude (hereinafter, referred to as 34° 43" 30' north latitude) to a location at 135° 35" 05' east longitude to 34° 43" 30' north latitude, it is shown that the zone from 135° 35" 30' east longitude and 34° 43" 30' north latitude to 135° 35" 25' east longitude and 34° 43" 30' north latitude can receive both a weak hierarchy and a strong hierarchy. However, the zone from 135° 35" 20' east longitude and 34° 43" 30' north latitude to 135° 35" 15' east longitude and 34° 43" 30' north latitude can receive only a strong hierarchy. Therefore, when digital broadcast reception device 100 performs reception of a weak hierarchy, it is necessary to perform hierarchy switching so as to receive a strong hierarchy. Furthermore, the zone from 135° 35" 10' east longitude and 34° 43" 30' north latitude to 135° 35" 05' east longitude and 34° 43" 30' north latitude can receive both a weak hierarchy and a strong hierarchy. Therefore, when the priority is given to the picture quality, it is necessary to perform hierarchy switching so as to receive a weak hierarchy again. Hereinafter, the reception quality information related to the position information in this way is referred to as a reception quality map.

Furthermore, database holding unit 111 holds reception quality information as to whether a weak hierarchy can be received or not. However, also when database holding unit 111 holds reception quality information as to whether a reception error occurs in a weak hierarchy or not, the same effect can be obtained. Furthermore, not only binary data but also, for example, CN ratio (Carrier to Noise ratio) information, reception error information, bit error rate, and the like, may be held as reception quality information. Also in such cases, the same effect can be obtained. For example, it can be judged that a weak hierarchy cannot be received when the CN ratio information shows a predetermined value or less.

Note here that a reception state is changed depending upon the shape of a vehicle on which digital broadcast reception device 100 is mounted or a setting position of an antenna. Therefore, when the reception quality information held in database holding unit 111 is used after it is converted or corrected based on the shape of a vehicle or the setting position of an antenna, more precise reception quality information can be obtained. Furthermore, when the reception quality information is used after it is converted or corrected by comparing the reception quality information held in database holding unit 111 with CN information, reception error information, a bit error rate, and the like, which are actually received by digital broadcast reception device 100, more precise reception quality information can be obtained. Furthermore, the reception state of digital broadcast reception device 100 may be also changed depending upon the movement speed. Therefore, the reception quality information is used after it is converted and corrected based on the movement speed, more precise reception quality information can be obtained.

Figure 3:
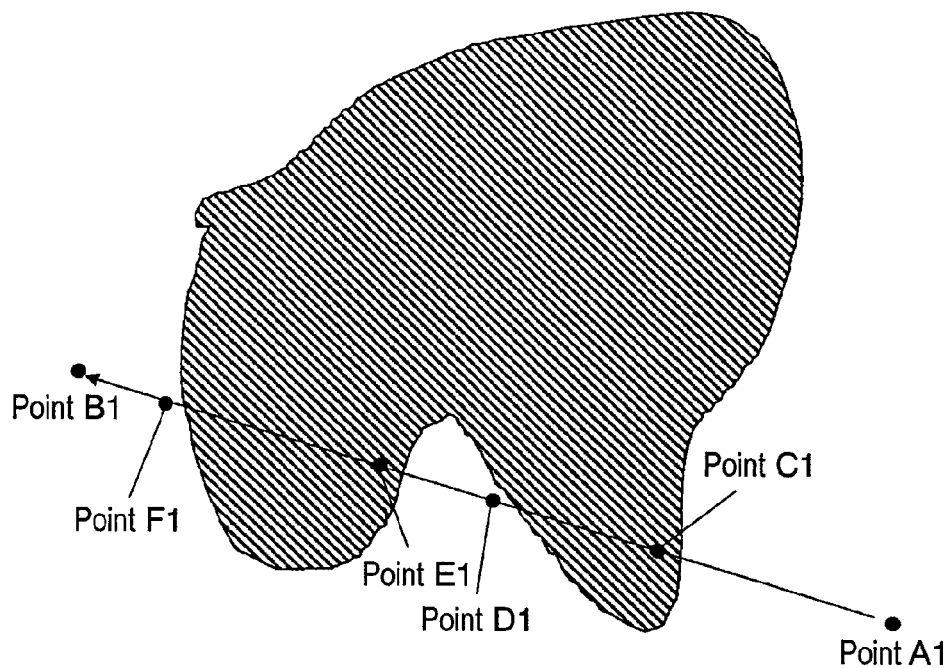
FIG. 3 is a data configuration view showing an example of reception quality information relating to a wide range held in a database holding unit in accordance with the first exemplary embodiment of the present invention.

Next, FIG. 3 shows an example of reception quality information, relating to a wider range as compared with FIG. 2, held in database holding unit 111. In this figure, a hatched zone corresponds to the data of "x" in FIG. 2, showing a zone capable of receiving only a strong hierarchy. A not-hatched zone in this figure corresponds to the data of "o" in FIG. 2, showing a zone capable of receiving both a weak hierarchy and a strong hierarchy.

As mentioned above, digital broadcast reception device 100 of the present invention has a feature that switching point calculation unit 109 outputs a hierarchy switching request signal before a reception error occurs. Before an operation based on the feature is described, for comparison, an operation of digital broadcast reception device 100 whose function is restricted so that the hierarchy switching request signal is not output before a reception error occurs is described. Herein, the case where digital broadcast reception device 100 whose function is thus restricted moves from point A1 to point B1 is taken as an example.

Firstly, function-restricted digital broadcast reception device 100 starts from point A1 in a state in which reception of a weak hierarchy is performed. When device 100 moves to point C1, it detects a reception error, and it carries out a hierarchy switching so as to receive a strong hierarchy. At this time, a turbulence of video or a disconnection of audio occurs due to a reception error during viewing and listening. Then, at point D1, device 100 detects that reception of a weak hierarchy can be also performed, and carries out a hierarchy switching so as to receive a weak hierarchy. Then, after further movement, it detects a reception error at point E1 and carries out hierarchy switching so as to receive a strong hierarchy. At this time, a turbulence of video or a disconnection of audio occurs due to a reception error during viewing and listening. Then, at point F1, it detects that reception of a weak hierarchy can be also performed and carries out hierarchy switching so as to receive a weak hierarchy. Then, device 100 reaches point B1. In this way, a method of switching hierarchies after detecting a reception error is not preferable because a turbulence of video or a disconnection of audio occurs during viewing and listening.

Figure 4:
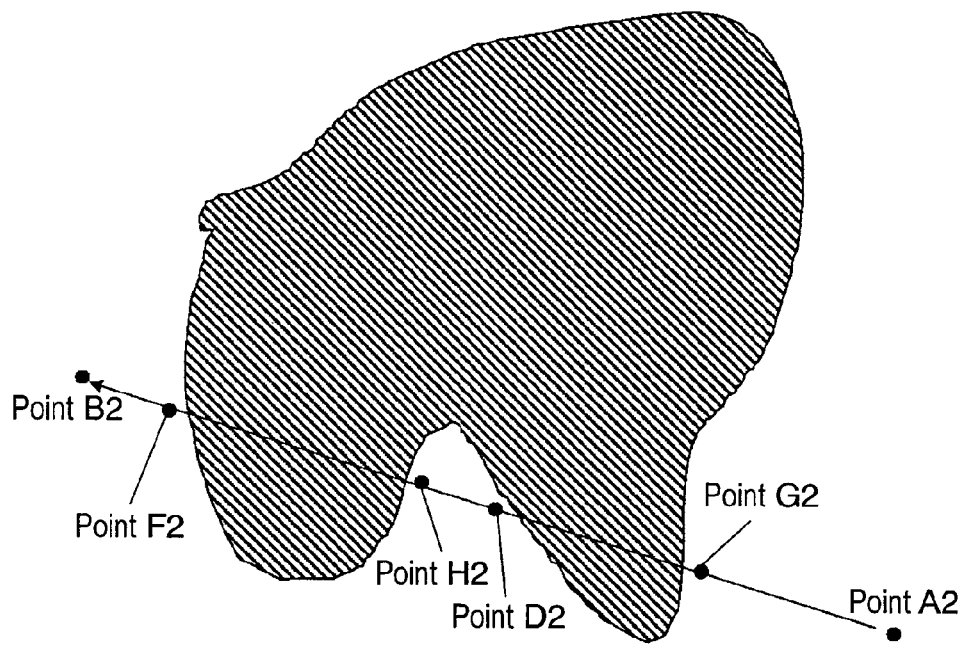
FIG. 4 is a data configuration view showing an example of reception quality information relating to a wide range held in a database holding unit in accordance with the first exemplary embodiment of the present invention.

Next, with reference to FIG. 4, a case of digital broadcast reception device 100 is described as in this exemplary embodiment in which the reception quality map is provided, and thereby switching point calculation unit 109 outputs a hierarchy switching request signal before a reception error occurs. Similar to FIG. 3, FIG. 4 is a data configuration view showing one example of reception quality information relating to a wider range held in a database holding unit in accordance with the first exemplary embodiment of the present invention. In the case of digital broadcast reception device 100 having a reception quality map, before digital broadcast reception device 100 moves to an area that is not capable of receiving a weak hierarchy, a hierarchy switching is performed so as to receive a strong hierarchy. Thereby, it is possible to realize a digital broadcast reception device in which a turbulence of video or a disconnection of audio does not occur. The case where the device moves from point A2 to point B2 is described as an example.

Firstly, digital broadcast reception device 100 starts from point A2 in a state in which it receives a weak hierarchy. Then, at point G2, switching point calculation unit 109 detects an existence of an area on a movement route in which a weak hierarchy cannot be received. Then, switching point calculation unit 109 carries out hierarchy switching so as to receive a strong hierarchy. Then, at point D2, from a reception error or the reception quality map, switching point calculation unit 109 detects that a weak hierarchy can be also received, and it carries out hierarchy switching so as to receive a weak hierarchy. Then, the device further moves. At point H2, switching point calculation unit 109 detects that it enters an area on the movement route in which a weak hierarchy cannot be received, and then it carries out hierarchy switching so as to receive a strong hierarchy. Then, at point F2, from a reception error or the reception quality map, switching point calculation unit 109 detects that a weak hierarchy can be also received, and it carries out hierarchy switching so as to receive a weak hierarchy.

Thus, when switching point calculation unit 109 detects an existence of an area on a movement route in which a weak hierarchy cannot be received from the reception quality information stored in database holding unit 111, it carries out hierarchy switching so as to receive a strong hierarchy before it reaches a point in which a weak hierarchy cannot be received. Herein, the switching point may be determined in advance to be a point that is a predetermined distance, for example, 1 km before reaching a point from which a weak hierarchy comes to be unable to be received. Switching point calculation unit 109 may determine the hierarchy switching point to be a point, which moves 1 km backward on the movement route from the point from which a weak hierarchy comes to be unable to be received, that is, a boundary between a point having reception quality information that both a weak hierarchy and a strong hierarchy can be received and a point having reception quality information that only a strong hierarchy can be received. Note here that this exemplary embodiment specifies the hierarchy switching point taken 1 km as an example of the predetermined distance. However, the same effect can be obtained by employing time information. That is to say, for example, a predetermined time is one minute and the hierarchy switching point may be set to a point one minutes before the device is assumed to reach the switching point. Note here that in the case of time information, it is necessary to carry out the calculation based on the movement speed of digital broadcast reception device 100.

Next, with reference to FIG. 5, an example in which switching point calculation unit 109 calculates a hierarchy switching point that is a point at which a hierarchy to be received is switched. For example, in FIG. 5, in the movement from point A3 to point B3, when a weak hierarchy is received at point A3, unless switching hierarchy is carried out so as to receive a strong hierarchy before reaching point D3 from which a weak hierarchy comes to be unable to be received, a reception error may occur after passing point D3. Then, before reaching point D3, it is necessary to carry out hierarchy switching from the reception of a weak hierarchy to the reception of a strong hierarchy. For example, when switching is carried out ct seconds before reaching point D3, that is, a limit point capable of receiving a weak hierarchy, the time from the current point to point D3 is started to be calculated from point A3. For example, when the current point is point E between point A3 and point D3, distance ed, that is, a distance from point E3 to point D3 can be calculated from the difference between a position information signal obtained from the position information detection unit and position information corresponding to reception quality information stored in database holding unit 111. Then, speed ev that is a speed at point E3 can be calculated from time-related position information from the position information detection unit.

Then, by using such information, time et that is a time to reach point D3 from point E3 is calculated. Specifically, time et is a value obtained by dividing distance ed by speed ev. Then, from point A3 to point D3, the time to reach point D3 is calculated continuously or intermittently. When the calculated time to reach point D3 is identical to or shorter than time ct, switching point calculation unit 109 outputs a hierarchy switching request signal to output switching unit 105. In the case of FIG. 5, the hierarchy switching point is point C3. Furthermore, when the hierarchy switching from reception of a strong hierarchy to reception of a weak hierarchy is carried out, switching point calculation unit 109 calculates the hierarchy switching point by employing the same calculation method.

Next, an operation of switching point calculation unit 109 in this exemplary embodiment is described. Switching point calculation unit 109 predicts a movement route on which digital broadcast reception device 100 moves based on a position information signal from position information detection unit 108 and a movement direction information signal from movement direction detection unit 112, and reads out reception quality information corresponding to the movement route from database holding unit 111. Then, switching point calculation unit 109 counts the number of hierarchy switching points in a predetermined zone on the movement route, for example, 5 km zone. For example, in the case of the schematic view shown in FIG. 6, the hierarchy switching occurs at four points, i.e., C4, D4, E4 and F4. At points C3 and E4, reception of a weak hierarchy is switched to reception of a strong hierarchy; and at points D4 and F4, reception of a strong hierarchy is switched to reception of a weak hierarchy.

Herein, it is assumed that digital broadcast reception device 100 of this exemplary embodiment permits three hierarchy switching points at maximum in a 5 km-zone in advance. Therefore, switching point calculation unit 109 calculates so that hierarchy switching does not occur at points D4 and E4. That is to say, the hierarchy switching point is reduced at two points, that is, the hierarchy switching point D4 from reception of a weak hierarchy to reception of a strong hierarchy and the hierarchy switching at point E4 from reception of a strong hierarchy to reception of a weak hierarchy are reduced. Therefore, a weak hierarchy is received from point A4 to point C4; a strong hierarchy is received from point C4 to point F4; and a weak hierarchy is received from point F4 to point B4. From point D4 to E4, a weak hierarchy is received in the above-mentioned digital broadcast reception device 100 of this exemplary embodiment. However, in this zone, a strong hierarchy is received. In this way, in this exemplary embodiment, one weak hierarchy that is a part of the three zones in which reception of a weak hierarchy can be carried out is made to receive a strong hierarchy. Then, based on the calculated hierarchy switching point, switching point calculation unit 109 outputs a hierarchy switching request signal to output switching unit 105 when the position information signal from position information detection unit 108 is identical to the calculated hierarchy switching point.

As mentioned above, when switching point calculation unit 109 calculates hierarchy switching points generated in a predetermined distance ahead and when the number of the hierarchy switching points is a predetermined number or more, a part of the in which reception of a weak hierarchy can be carried out may be switched to reception of a strong hierarchy. Thus, since the number of the hierarchy switching points can be reduced, digital broadcast reception device 100 capable of reducing disconnections of a video signal and an audio signal can be provided. This exemplary embodiment describes an example in which the predetermined distance is made to be 5 km and the predetermined number of the hierarchy switching points is three. However, a distance or number is not particularly limited to this. Furthermore, in this example, the hierarchy switching from reception of a weak hierarchy to reception of a strong hierarchy is carried out from point D4 to point E4. However, as a zone that is subjected to such change, it is desired to select a shorter zone in the zones within a predetermined distance. Thereby, it is possible to increase the time for which higher-resolution picture can be received.

In this exemplary embodiment, it is assumed that the reception point of the digital receiving device is stopped or is moving, and it is shown that the reception performance is changed depending upon the movement speed. That is to say, as the movement speed is faster, the reception performance is deteriorated. Thus, by switching a hierarchy to be received by using movement speed information of digital broadcast reception device 100, switching of the receiving hierarchy can be carried out more precisely. For example, FIG. 7 shows extracted data of one point in the reception quality information held in database holding unit 111. The data show the reception quality with respect to the movement speeds of digital broadcast reception device 100. In the drawing, "o" shows a movement speed at which both a weak hierarchy and a strong hierarchy can be received, and "x" shows a movement speed at which only a strong hierarchy can be received. For example, in the columns "40 km/h" and "60 km/h" in FIG. 7, data "o" are held. Therefore, it is shown that in the state in which digital broadcast reception device 100 moves up to a speed of 60 km/h, both a weak hierarchy and a strong hierarchy can be received. On the other hand, in the columns "80 km/h" and "100 km/h", data "x" are held. Therefore, it is shown that in the state in which digital broadcast reception device 100 moves at a speed of 80 km/h or more, only a strong hierarchy can be received. Then, in this state, since a weak hierarchy cannot be received, when the reception of a weak hierarchy is carried out, it is shown to be necessary that hierarchy switching is carried out so as to receive a strong hierarchy.

As the movement speed, when the average speed of a mobile body in a predetermined distance is used instead of using always changing movement speed, it is possible to reduce the number of correction calculation of reception quality information. Furthermore, as the movement speed, when the average speed of a mobile body in a predetermined time is used instead of using always changing movement speed, it is possible to reduce the number of correction calculation of reception quality information.

Next, with reference to FIG. 8, an example of reception quality information held in database holding unit 111 in a plurality of points. The data show the reception quality of each point with respect to the longitude and latitude information at respective points for each movement speed of digital broadcast reception device 100. In the drawing, "o" shows a zone capable of receiving both a weak hierarchy and a strong hierarchy, and "x" shows a zone capable of receiving only a strong hierarchy. In the data, four reception qualities are shown for each point. That is to say, the data show the reception quality at each point with respect to four movement speeds of digital broadcast reception device 100. In the four pieces of reception quality information at each point, "o" or "x" on the upper left part shows the reception quality when device 100 moves at a speed of 40 km/h. Furthermore, "o" or "x" on the upper right part shows the reception quality when device 100 moves at a speed of 60 km/h. Furthermore, "o" or"x" on the lower left part shows the reception quality when device 100 moves at a speed of 80 km/h, and "o" or "x" on the lower right part shows the reception quality when device 100 moves at a speed of 100 km/h.

For example, with the reference to data at 135° 35" 20' east longitude and 34° 43" 35' north latitude, the upper left data "40 km/h" and the upper right data "60 km/h" are denoted by "o". Therefore, it is shown that in the state in which digital broadcast reception device 100 moves up to the speed of 60 km/h, both a weak hierarchy and a strong hierarchy can be received. On the other hand, the lower left data "80 km/h" and the lower right data "100 km/h" are denoted by "x". Therefore, it is shown that in the state in which digital broadcast reception device 100 moves at a speed of 80 km/h or more, only a strong hierarchy can be received. Then, in this state, since a weak hierarchy cannot be received, when reception of a weak hierarchy is carried out, it is shown to be necessary that hierarchy switching is carried out so as to receive a strong hierarchy.

Furthermore, for example, in the case of the movement from 135° 35" 30' east longitude and 34° 43" 45' north latitude to 135° 35" 05' east longitude and 34° 43" 45' north latitude, when device 100 moves at a speed of 60 km/h, the upper right data of the zone from 135° 35" 30' east longitude and 34° 43" 45' north latitude to 135° 35" 20' east longitude and 34° 43" 45' north latitude, that is, the reception quality data at a speed of 60 km/h are denoted by "o". Therefore, in this case, it is shown that both a weak hierarchy and a strong hierarchy can be received. However, the upper right data of the zone from 135° 35" 15' east longitude and 34° 43" 45' north latitude to 135° 35" 10' east longitude and 34° 43" 45' north latitude, that is, the reception quality data at a speed of 60 km/h are denoted by "x". Therefore, in this case, it is shown that only a strong hierarchy can be received. Furthermore, the upper right data of 135° 35" 05' east longitude and 34° 43" 45', that is, the reception quality data at a speed of 60 km/h are denoted by "o". Therefore, it is shown that both a weak hierarchy and a strong hierarchy can be received. That is to say, when the device moves at a speed of 60 km/h from 135° 35" 30' east longitude and 34° 43" 45' north latitude to 135° 35" 05' east longitude and 34° 43" 45' north latitude, when the reception of a weak hierarchy is carried out from 135° 35" 20' east longitude and 34° 43" 45' north latitude to 135° 35" 15' east longitude and 34° 43" 45' north latitude, it is shown to be necessary that hierarchy switching is carried out so as to receive a strong hierarchy. Furthermore, when broadcast with higher quality is carried out in a weak hierarchy as compared with a strong hierarchy, the priority is given to the quality of video and audio, it is necessary to switch from reception of a strong hierarchy to the reception of a weak hierarchy from 135° 35" 10' east longitude and 34° 43" 45' north latitude to 135° 35" 05' east longitude and 34° 43" 45' north latitude.

However, when device 100 moves at a speed of 80 km/h in the same zone, that is, the zone from 135° 35" 30' east longitude and 34° 43" 45' north latitude to 135° 35" 05' east longitude and 34° 43" 45' north latitude, unlike the case where device 100 moves at a speed of 60 km/h, the lower left data of the zone from 135° 35" 30' east longitude and 34° 43" 45' north latitude to 135° 35" 25' east longitude and 34° 43" 45' north latitude, that is, reception quality data at a speed of 80 km/h are denoted by "o". Therefore, in this case, it is shown that both a weak hierarchy and a strong hierarchy can be received. However, the lower left data of the zone from 135° 35" 20' east longitude and 34° 43" 45' north latitude to 135° 35" 05' east longitude and 34° 43" 45' north latitude, that is, the reception quality data at a speed of 80 km/h are denoted by "x". Therefore, in this case, it is shown that only a strong hierarchy can be received. That is to say, when device 100 moves at a speed of 80 km/h from 135° 35" 30' east longitude and 34° 43" 45' north latitude to 135° 35" 05' east longitude and 34° 43" 45' north latitude, when reception of a weak hierarchy is performed from 135° 35" 25' east longitude and 34° 43" 45' north latitude to 135° 35" 20' east longitude and 34° 43" 45' north latitude, it is shown to be necessary that hierarchy switching is carried out so as to receive a strong hierarchy. Furthermore, it is shown that from 135° 35" 20' east longitude and 34° 43" 45' north latitude to 135° 35" 05' east longitude and 34° 43" 45', a strong hierarchy cannot be received.

As mentioned above, an optimum point for switching hierarchy to be received is different depending upon the movement speed. Therefore, switching point calculation unit 109 may calculate the movement speed of digital broadcast reception device 100 based on the position information signal, and may operate so as to allow the hierarchy switching point to be variable in accordance with the movement speed. Thus, when reception quality data with respect to the movement speed are held in database holding unit 111, it is possible to realize more precise hierarchy switching in which the deterioration of the reception quality by the movement speed is taken into consideration.

Note here that in this exemplary embodiment, four movement speeds are shown as an example. However, when database holding unit 111 holds more detailed reception quality information about the movement speed, more precise hierarchy switching can be realized.

Note here that in this exemplary embodiment, four movement speeds are shown as an example. However, speed information is subjected to an interpolation calculation based on the reception quality information held in database holding unit 111, thereby enabling higher precise hierarchy switching to be realized.

Note here that the reception quality is affected by the direction of the antenna of digital broadcast reception device 100. Therefore, when the reception quality information is used after it has been converted and corrected depending upon the direction of the antenna, that is, the movement direction of digital broadcast reception device 100, more precise reception quality information can be obtained.

Figure 9:
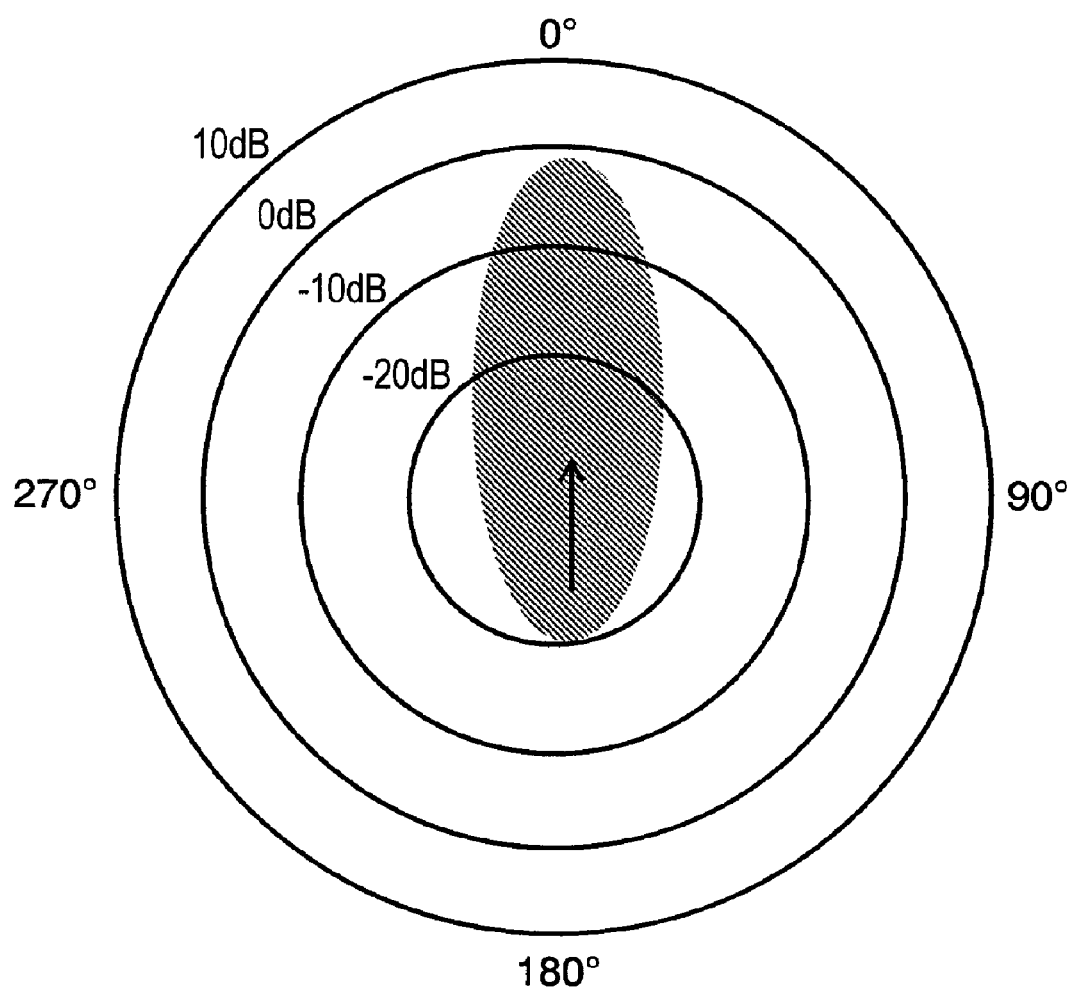
FIG. 9 is a configuration view showing an example of the reception property of an antenna in accordance with the first exemplary embodiment of the present invention.
Figure 10:
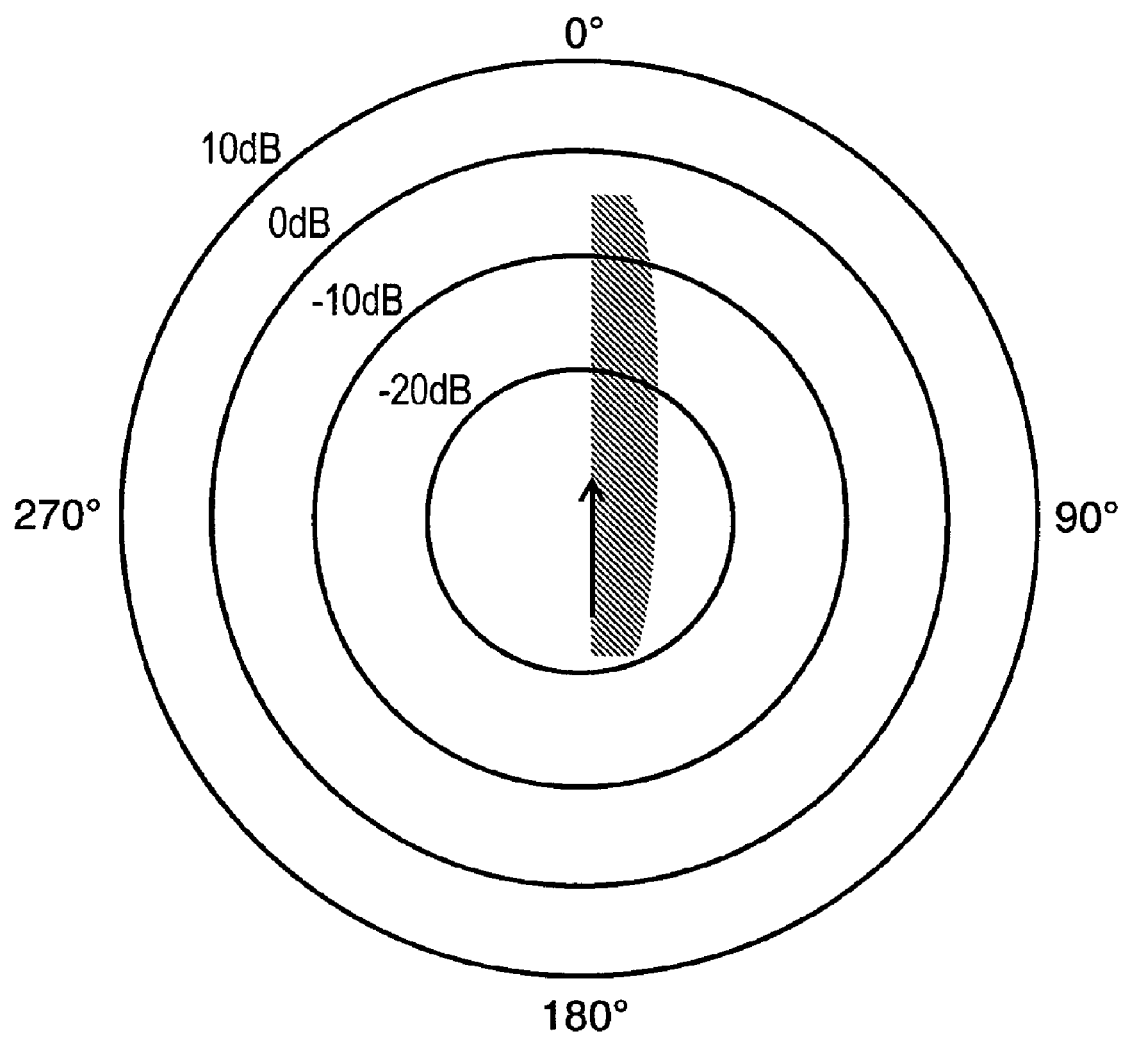
FIG. 10 is a configuration view showing an example of a receiving property of an antenna set in a mobile body main body in accordance with the first exemplary embodiment of the present invention.

For example, FIG. 9 shows an example of the receiving property of an antenna of a general digital broadcast reception device. This drawing shows the receiving property of an antenna and the hatched area shows receiving sensitivity region of the antenna. As shown in this figure, 0°, 90°, 180° and 270° on the circumference show the azimuth of the directivity of the antenna; and 10 dB, 0 dB and the like, represent the relative gain of the antenna. Furthermore, as shown by an arrow in FIG. 9, 0° is defined as a movement direction of the digital broadcast reception device. In this way, the receiving property of an antenna is not shown by a circular shape. In the case of such an antenna, with respect to the movement direction of the mobile body, when the digital broadcast is received, the receiving sensitivity is good with respect to the reception of a radio wave coming from the direction of front 0°. However, the receiving sensitivity is bad with respect to the reception of a radio wave coming from the other directions. In particular, when a radio wave is coming from the side direction or the rear direction, the receiving sensitivity is bad. That is to say, the receiving sensitivity is changed depending upon the movement direction of the digital broadcast reception device. Furthermore, depending upon the setting position of the antenna, it is thought that the receiving property of the antenna may be in the shadow of the mobile body main body on which a digital broadcast reception device is mounted. For example, FIG. 10 shows the receiving property of an antenna when it is set on a mobile body main body. The hatched area shows a receiving sensitivity region of the antenna. Furthermore, as shown by an arrow in FIG. 10, 0° is defined as a movement direction of digital broadcast reception device 100. As compared with the receiving property of the antenna shown in FIG. 9, in the antenna shown in FIG. 10, it is shown that the sensitivity of the left half of the antenna is remarkably deteriorated. In such a case, the receiving sensitivity may be further changed depending upon the direction in which a radio wave is coming.

When database holding unit 111 holds the reception quality information with respect to the movement direction at each point, more precise hierarchy switching can be realized. FIG. 11 shows an example of the reception quality information held in database holding unit 111 at a plurality of points. The data show the reception quality with respect to the longitude and latitude information at each point for each movement direction of digital broadcast reception device 100. A part denoted by "o" shows a zone capable of receiving both a weak hierarchy and a strong hierarchy, and a part denoted by "x" shows a zone capable of receiving only a strong hierarchy. The data show four reception qualities for each point and show the reception quality with respect to the movement direction of digital broadcast reception device 100 at each point. In the four pieces of reception quality information at each point, "o" or "x" on the upper left part shows the reception quality when digital broadcast reception device 100 is moving north. Furthermore, "o" or "x" on the upper right part shows the reception quality when digital broadcast reception device 100 is moving east. Furthermore, "o" or "x" on the lower left part shows the reception quality when digital broadcast reception device 100 is moving south, and "o" or "x" on the lower right part shows the reception quality when digital broadcast reception device 100 is moving west.

For example, the data at 135° 35" 20' east longitude and 34° 43" 35' north latitude are described. The upper left data when movement direction is north and the upper right data when the movement direction is east are denoted by "o". Therefore, when digital broadcast reception device 100 is moving north or east in 135° 35" 20' east longitude and 34° 43" 35' north latitude, it is shown that both a weak hierarchy and a strong hierarchy can be received. On the other hand, when the lower left data in which the movement direction is south and the lower right data in which the movement direction is west are denoted by "x". Therefore, when digital broadcast reception device 100 is moving south or west in 135° 35" 20' east longitude and 34° 43" 35' north latitude, it is shown that only a strong hierarchy can be received. In this case, since the reception of a weak hierarchy cannot be carried out, when a weak hierarchy is received, it is shown to be necessary that hierarchy switching is carried out so as to receive a strong hierarchy.

Furthermore, for example, during movement from 135° 35" 30' east longitude and 34° 43" 45' north latitude to 135° 35" 05' east longitude and 34° 43" 45' north latitude, the movement direction is west. The lower right data of the zone from 135° 35" 30' east longitude and 34° 43" 45' north latitude to 135° 35" 25' east longitude and 34° 43" 45' north latitude, that is, reception quality data when the movement direction is west are denoted by "o". Therefore, in this case, it is shown that both a weak hierarchy and a strong hierarchy can be received. However, since the lower right data of the zone from 135° 35" 20' east longitude and 34° 43" 45' north latitude to 135° 35" 05' east longitude and 34° 43" 45' north latitude, that is, the reception quality data when the movement direction is west are denoted by "x", it is shown that only a strong hierarchy can be received.

In other words, in the movement to the west from 135° 35" 30' east longitude and 34° 43" 45' north latitude to 135° 35" 05' east longitude and 34° 43" 45' north latitude, when reception of a weak hierarchy is performed from 135° 35" 25' east longitude and 34° 43" 45' north latitude to 135° 35" 20' east longitude and 34° 43" 45' north latitude, it is shown to be necessary that hierarchy switching is performed so as to receive a strong hierarchy.

However, the case in which the device moves in the opposite direction in the same zone, that is, the device moves east from 135° 35" 05' east longitude and 34° 43" 45' north latitude to 135° 35" 30' east longitude and 34° 43" 45' north latitude is different from the case in which the device moves west in the same zone. In other words, the upper right data of 135° 35" 05' east longitude and 34° 43" 45' north latitude, that is, the reception quality data when the movement direction is east are denoted by "o". Therefore, in this case, it is shown that both a weak hierarchy and a strong hierarchy can be received. However, the upper right data of the zone from 135° 35" 10' east longitude and 34° 43" 45' north latitude to 135° 35" 15' east longitude and 34° 43" 45' north latitude, that is, the reception quality data when the movement direction is east is denoted by "x". Therefore, it is shown that only a strong hierarchy can be received. The upper right data of the zone from 135° 35" 20' east longitude and 34° 43" 45' north latitude to 135° 35" 30' east longitude and 34° 43" 45' north latitude, that is, the reception quality data when the movement direction is east are denoted by "o". Therefore, it is shown that both a weak hierarchy and a strong hierarchy can be received.

In other words, when the device moves to the east from 135° 35" 05' east longitude and 34° 43" 45' north latitude to 135° 35" 30' east longitude and 34° 43" 45' north latitude, when reception of a weak hierarchy is performed from 135° 35" 05' east longitude and 34° 43" 45' north latitude to 135° 35" 10' east longitude and 34° 43" 45' north latitude, it is shown to be necessary that switching is carried out so as to receive a strong hierarchy. Furthermore, when a higher quality broadcast is carried out in a weak hierarchy as compared with a strong hierarchy, the priority is given to the quality of video and audio, it is necessary to switch from reception of a strong hierarchy to reception of a weak hierarchy during movement from 135° 35" 15' east longitude and 34° 43" 45' north latitude to 135° 35" 20' east longitude and 34° 43" 45' north latitude.

That is to say, an optimum hierarchy switching point is different depending upon the movement direction. Therefore, switching point calculation unit 109 may calculate the movement direction of digital broadcast reception device 100 based on the position information signal, and may be operated so that the hierarchy switching point is allowed to be variable in accordance with the movement direction. Thus, when database holding unit 111 holds the reception quality data with respect to the movement direction, more precise hierarchy switching in which the deterioration of the reception quality in the movement direction is taken into consideration can be realized.

Note here that in this exemplary embodiment, four movement speeds are shown as an example. However, when more detailed reception quality information about the movement direction is held in database holding unit 111, more precise hierarchy switching can be realized. Furthermore, in this exemplary embodiment, four movement speeds are shown as an example. However, the movement direction is subjected to an interpolation calculation based on the reception quality information held in database holding unit 111, thereby enabling higher precise hierarchy switching to be realized.

Note here that in this exemplary embodiment, the reception quality information held in database holding unit 111 is always fixed. However, for example, by rewriting the data at the actually running point based on the reception quality information obtained at the time of actually running, more precise reception quality information can be obtained. Furthermore, when reception quality information at the actually running point is received from a digital broadcast reception device that moves in the opposite side or a digital broadcast reception device moving in the same direction and is rewritten into the reception quality information at each point in the reception quality information held in database holding unit 111, more precise reception quality information can be obtained.

In this exemplary embodiment, switching point calculation unit 109 calculates hierarchy switching points generated in a predetermined distance ahead, and when the number of the hierarchy switching points is predetermined number or more, by restricting the hierarchy switching, the number of the hierarchy switching points is reduced. However, switching point calculation unit 109 may calculate hierarchy switching points generated in a predetermined time ahead, and when the number of the hierarchy switching points is predetermined number or more, a part of the zone in which reception of a weak hierarchy can be carried out may be switched to reception of a strong hierarchy. In this way, when the number of the hierarchy switching points in the predetermined time are reduced by using speed information, the same effect can be obtained.

In this exemplary embodiment, by reducing the number of the hierarchy switching points in a predetermined distance or time ahead, the number of the hierarchy switching points is reduced. However, when the distance or time may be variable based on the speed or reception state, the same effect can be obtained.

In this exemplary embodiment, the movement direction is predicted based on the position information signal from position information detection unit 108 and the movement direction information signal from movement direction detection unit 112. However, traveling road may be acquired from a map such as a navigation system from the position information signal and the movement direction information signal, and the route of the road is used as movement route information, the same effect can be obtained.

In this exemplary embodiment, the movement direction is predicted based on the position information signal from position information detection unit 108 and the movement direction information signal from movement direction detection unit 112. However, road map information may be used together, or route information calculated by using a navigation system and the like based on the current point and the target point may be also used. In such cases, the same effect can be obtained.

Thus, this exemplary embodiment has a feature that switching point calculation unit 109 controls output switching unit 105 based on the reception quality information, the movement direction information signal and the position information signal, thereby carrying out the hierarchy switching. Thus, it is possible to provide digital broadcast reception device 100 in which the frequency of the hierarchy switching generated during movement is predicted in advance and the frequency of the hierarchy switching is reduced, thereby reducing disconnections of a video signal and an audio signal.

This exemplary embodiment describes the case where broadcast is transmitted by using two hierarchies. For example, in a weak hierarchy, high-definition broadcast is transmitted in a 64QAM modulation format; and in a strong hierarchy, simple motion picture is transmitted in a QPSK modulation format. In this exemplary embodiment, an example in which signals of a strong hierarchy and a weak hierarchy are multiplexed on the same physical channel is described. However, for example, even if they are transmitted in a separate physical channel, the same effect can be obtained. Furthermore, even when they reach the digital broadcast reception device in an utterly different transmission paths, the same effect can be obtained.

Second Exemplary Embodiment

Figure 12:
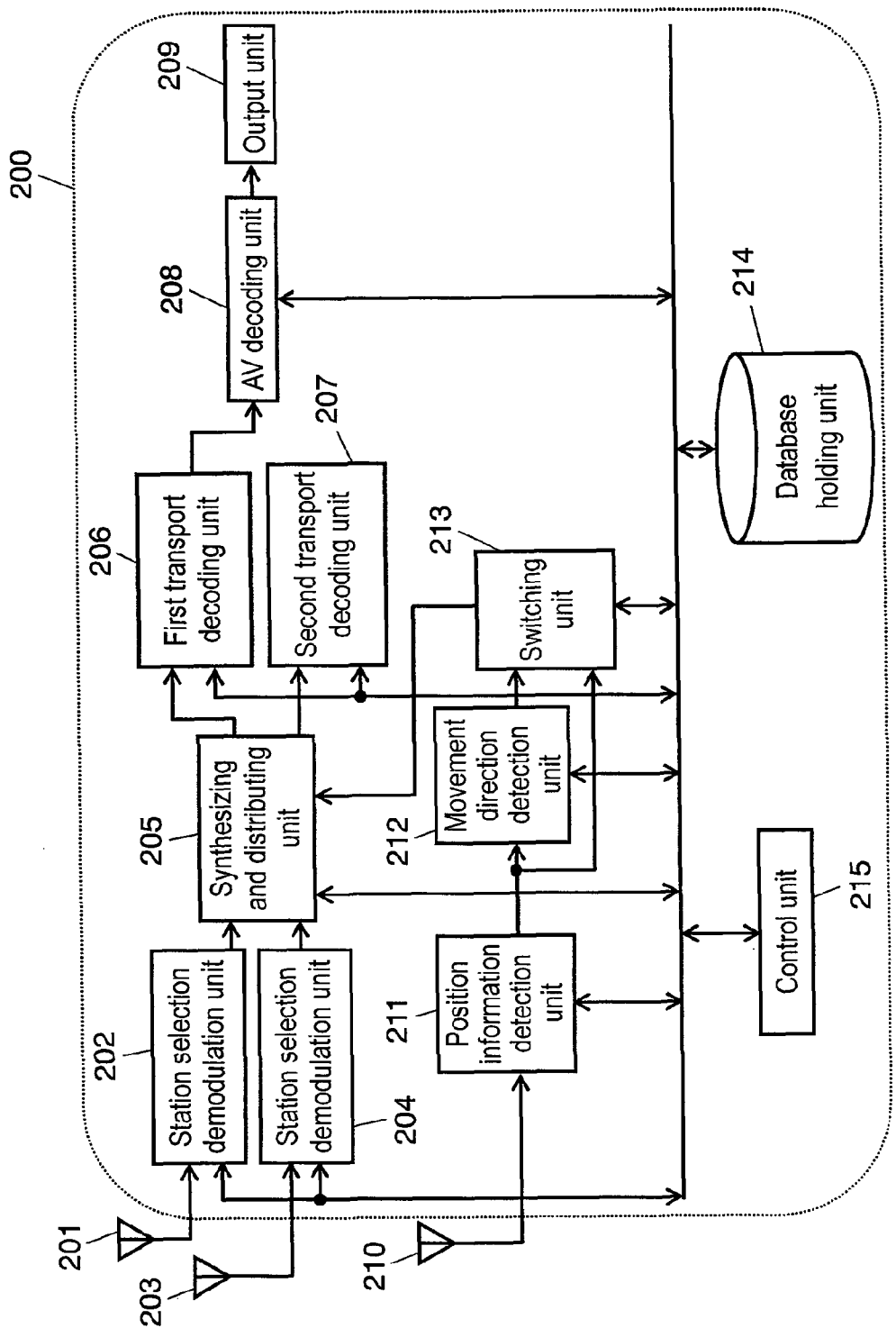
FIG. 12 is a block diagram showing a configuration of a digital broadcast reception device in accordance with a second exemplary embodiment of the present invention.

FIG. 12 is a block diagram showing a configuration of digital broadcast reception device 200 in accordance with this exemplary embodiment. Digital broadcast reception device 200 shown in FIG. 12 includes first antenna 201 and third antenna 203 as a plurality of broadcast wave reception antennas for receiving a broadcast signal; and first and second station selection demodulation units 202 and 204 as a plurality of station selection demodulation units. Furthermore, digital broadcast reception device 200 includes synthesizing and distributing unit 205, first transport decoding unit 206, second transport decoding unit 207, AV decoding unit 208, and output unit 209. Furthermore, digital broadcast reception device 200 includes second antenna 210 as a reference position information reception antenna, position information detection unit 211, movement direction detection unit 212, switching unit 213, database holding unit 214 and control unit 215.

The thus configured digital broadcast reception device 200 of this exemplary embodiment includes first antenna 201 and third antenna 203 for receiving a broadcast signal, and first and second station selection demodulation units 202 and 204. Therefore, this exemplary embodiment is different from the first exemplary embodiment in that received signals are obtained from two systems, respectively. Furthermore, digital broadcast reception device 200 is different from the first exemplary embodiment in that since it includes synthesizing and distributing unit 205 and database holding unit 214, switching unit 213 can switch, synthesize or distribute received signals from two systems based on reception quality information held in database holding unit 214.

That is to say, digital broadcast reception device 200 can receive a signal from one system by using one broadcast wave reception antenna and one station selection demodulation unit. Furthermore, in a harsh reception environment, signals from two systems are synthesized and received by using two broadcast wave reception antennas and two station selection demodulation units. In this way, digital broadcast reception device 200 in this exemplary embodiment carries out antenna switching by switching the systems of received signals. Then, furthermore, it can select and receive a signal of a strong hierarchy or a weak hierarchy in accordance with the reception environment. Next, an operation of the thus configured digital broadcast reception device 200 is described in detail.

First station selection demodulation unit 202 selects and demodulates a signal from first antenna 201, and outputs it to synthesizing and distributing unit 205. First antenna 201 and first station selection demodulation unit 202 are used for viewing and listening broadcast. Second station selection demodulation unit 204 selects and demodulates a signal from third antenna 203 and outputs it to synthesizing and distributing unit 205. Third antenna 203 and second station selection demodulation unit 204 are used for viewing and listening broadcast or for background processing.

Synthesizing and distributing unit 205 receives an input of the signal from first station selection demodulation unit 202 and the signal from second station selection demodulation unit 204; synthesizes or distributes the signals from two systems; and then, outputs the signals to first transport decoding unit 206 and second transport decoding unit 207.

First transport decoding unit 206 transport decodes the signal output from synthesizing and distributing unit 205 and outputs it to AV decoding unit 208. Furthermore, second transport decoding unit 207 transport decodes the signal output from synthesizing and distributing unit 205 and outputs it to control unit 215. In this way, second transport decoding unit 207 is used for background processing.

AV decoding unit 208 decodes the signal output from first transport decoding unit 206 into a video signal and an audio signal, and outputs them to output unit 209. Furthermore, output unit 209 outputs the video signal and the audio signal output from AV decoding unit 208 to the outside of digital broadcast reception device 200.

Second antenna 210 outputs a reference position information signal including the received position information of digital broadcast reception device 200 to position information detection unit 211. Then, position information detection unit 211 detects a position information signal of digital broadcast reception device 200 based on the reference position information signal received by second antenna 210, and outputs the detected signal to movement direction detection unit 212 and switching unit 213.

Movement direction detection unit 212 detects the movement direction of digital broadcast reception device 200 based on the position information signal, and outputs it to switching unit 213. Furthermore, switching unit 213 calculates an antenna switching point and a hierarchy switching point based on the position information signal from position information detection unit 211, a movement direction signal from movement direction detection unit 212, and the reception quality information from database holding unit 214, and outputs a control request signal including at least an antenna switching request signal or a hierarchy switching request signal to synthesizing and distributing unit 205. This control request signal controls synthesizing and distributing unit 205. Herein, the antenna switching point denotes a point in which antenna switching is carried out by switching the number of the systems when switching unit 213 receives broadcast. Note here that a detailed operation by switching unit 213, which calculates an antenna switching point and a hierarchy switching point and outputs a control request signal, is described later.

Database holding unit 214 holds reception quality information related to position information. Hereinafter, the data are referred to as a reception quality map. Control unit 215 controls each block of digital broadcast reception device 200 and monitors the state.

Figure 13:
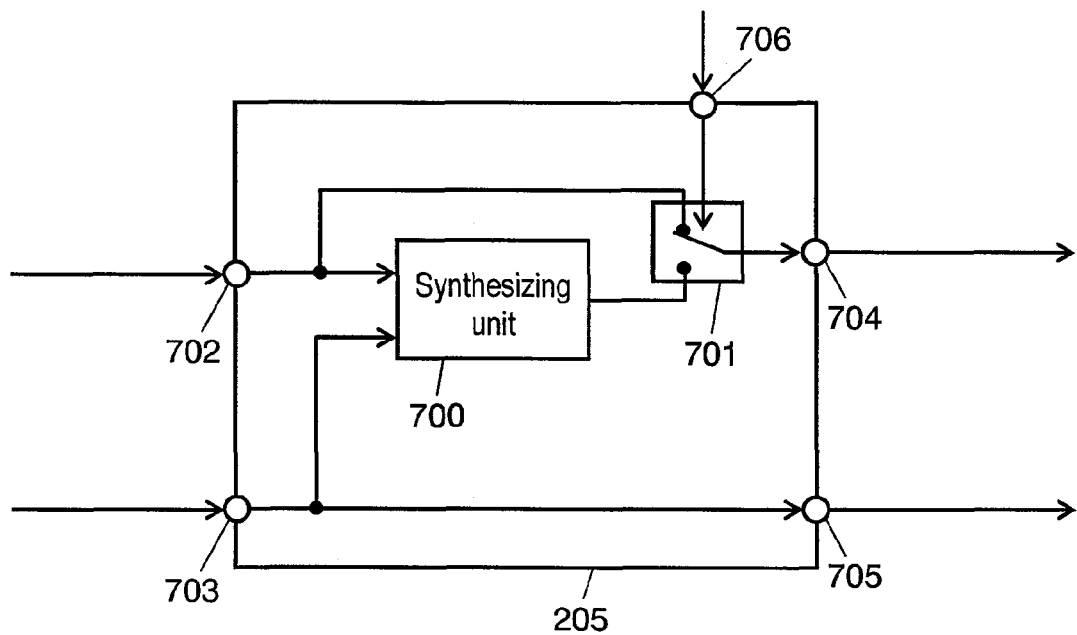
FIG. 13 is a block diagram showing a configuration of a synthesizing and distributing unit in accordance with the second exemplary embodiment of the present invention.

Firstly, with reference to FIG. 13, a configuration of synthesizing and distributing unit 205 and its operation are described. Synthesizing and distributing unit 205 includes synthesizing unit 700 and switch 701. Furthermore, synthesizing and distributing unit 205 includes first input terminal 702 for receiving an input of the signal output from first station selection demodulation unit 202, and second input terminal 703 for receiving an input of the signal output from second station selection demodulation unit 204. Furthermore, synthesizing and distributing unit 205 includes first output terminal 704 for outputting a signal to first transport decoding unit 206, second output terminal 705 for outputting a signal to transport decoding unit 207, and control request input terminal 706 for receiving an input of a control request signal output from switching unit 213.

Synthesizing unit 700 synthesizes a signal input from first station selection demodulation unit 202 to first input terminal 702 and a signal input from second station selection demodulation unit 204 to second input terminal 703. Synthesizing unit 700 in this exemplary embodiment carries out a carrier diversity that synthesizes an OFDM signal for each carrier.

A signal input from first input terminal 702 is input to synthesizing unit 700 and switch 701. A signal input from second input terminal 703 is input to synthesizing unit 700. Furthermore, a signal input from second input terminal 703 is output to second output terminal 705. A synthesized signal from synthesizing unit 700 is input to switch 701.

Switch 701 outputs any of the signal input from first input terminal 702 or the synthesized signal output from synthesizing unit 700 to switch output based on the control request signal input from switching unit 213 to control request input terminal 706. The output from switch 701 is output to first output terminal 704.

A signal input from second input terminal 703 is input to synthesizing unit 700. Furthermore, second input terminal 703 is connected to second output terminal 705.

An operation of position information detection unit 211 is the same as that of position information detection unit 108 in the first exemplary embodiment. Also, an operation of movement direction detection unit 212 is the same as that of movement direction detection unit 112 in the first exemplary embodiment. Therefore, the detailed description thereof is omitted.

Next, an entire operation of this exemplary embodiment is described. Digital broadcast reception device 200 of this exemplary embodiment includes two station selection demodulation units 202 and 204. Station selection demodulation units 202 and 204 can select the same channel or different channels, respectively. Furthermore, when digital broadcast reception device 200 of this exemplary embodiment has two station selection demodulation units 202 and 204 capable of selecting different channels, one can be used for viewing and listening broadcast and the other can be used for background processing. For example, it is possible to obtain a program schedule of different channels while viewing and listening broadcast, to carry out channel scanning for checking whether or not receivable broadcast is present, and to receive a download of broadcast.

Furthermore, digital broadcast reception device 200 of this exemplary embodiment includes synthesizing and distributing unit 205. Synthesizing and distributing unit 205 includes a synthesizing block having two systems of inputs. In this exemplary embodiment, an example in which a carrier diversity of OFDM is carried out by using synthesizing and distributing unit 205 is described. The carrier diversity synthesis is a technology in which a signal of each carrier of OFDM is synthesized individually, and thereby theoretically 3 dB of improvement of reception performance can be obtained when compared with a digital broadcast reception device having one antenna and one station selection demodulation unit. That is to say, even in an area in which it is difficult to receive a signal by one system using one antenna and one station selection demodulation unit, with signals of two systems synthesized by using two antennas and two station selection demodulation units, viewing and listening can be carried out without occurring a reception error. Hereinafter, when the case in which two antennas and two station selection demodulation units are used is described, since synthesizing unit 700 of synthesizing and distributing unit 205 is used, more stable reception can be achieved as compared with the case where one antenna and one station selection demodulation unit are used.

Next, with reference to FIG. 14, an extracted example of reception quality information held in database holding unit 214 is described. This data show sampling of the reception qualities at each point in a grid by using longitude and latitude information. In the drawing, "o" shows a zone in which reception can be carried out without a reception error by using only one antenna and one station selection demodulation unit (that it so say, one-system reception), and "x" shows a zone in which the reception is difficult unless two antennas and two station selection demodulation units are used (that it so say, two-system reception). For example, in the movement from a location at 135° 35" 30' east longitude and 34° 43" 30' north latitude to a location at 135° 35" 05' east longitude and 34° 43" 30' north latitude, it is shown that the reception can be carried out by using only one antenna and one station selection demodulation unit in the zone from 135° 35" 30' east longitude and 34° 43" 30' north latitude to 135° 35" 25' east longitude and 34° 43" 30' north latitude. However, in the zone from 135° 35" 20' east longitude and 34° 43" 30' north latitude to 135° 35" 15' east longitude and 34° 43" 30' north latitude, unless two antennas and two station selection demodulation units are used, the reception cannot be carried out without a reception error. Furthermore, it is shown that the reception can be carried out with only one antenna and one station selection demodulation unit in the zone from 135° 35" 10' east longitude and 34° 43" 30' north latitude to 135° 35" 05' east longitude and 34° 43" 30' north latitude. Hereinafter, the reception quality information related to the position information is referred to as a reception quality map.

Figure 15:
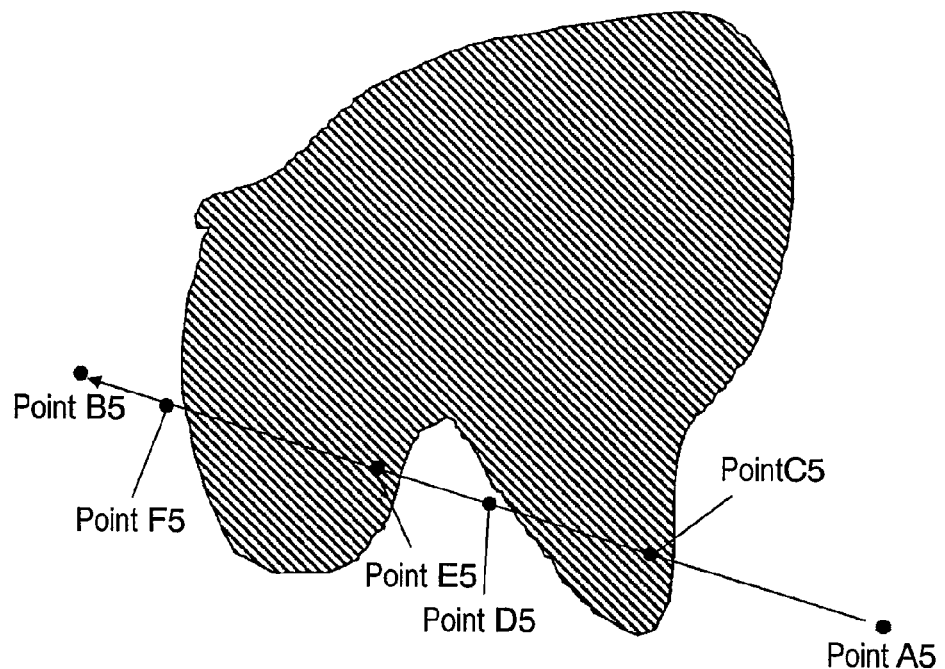
FIG. 15 is a view of data configuration showing an example of reception quality information relating to a wide range held in a database holding unit in accordance with the second exemplary embodiment of the present invention.

Next, FIG. 15 shows an example of reception quality information, relating to a wider range as compared with FIG. 14, held in database holding unit 214. In this figure, a hatched zone corresponds to the data of "x" in FIG. 14, showing a zone in which reception is difficult unless two antennas and two station selection demodulation units are used. A not-hatched zone in this figure corresponds to the data of "o" in FIG. 14, showing a zone in which reception can be carried out without a reception error by using only one antenna and one station selection demodulation unit. Herein, a case of the movement from point A5 to point B5 is descried as an example. Furthermore, at point A5, since one antenna and one station selection demodulation unit are used in the background processing, only one antenna and one station selection demodulation unit can be used for viewing and listening. In FIG. 15, it is assumed that digital broadcast reception device 200 can receive a weak hierarchy in the entire zone.

Furthermore, in this exemplary embodiment, it is assumed that binary reception quality information as to whether the reception can be carried out without a reception error or a reception error occurs when reception is carried out by using one antenna and one station selection demodulation unit. However, the same effect can be obtained by using CN ratio information, reception error information, bit error rate, and the like. For example, CN ratio information is held as reception quality information and when CN ratio information is predetermined value or less, it can be determined that the reception cannot be carried out with one antenna and one station selection demodulation unit. Furthermore, the same effect can be obtained by holding reception quality information of how many pairs of antenna and station selection demodulation unit to be used so as to carry out reception without a reception error based on the signal quality information, or by calculating how many pairs of antenna and station selection demodulation unit to be used so as to carry out reception without a reception error based on CN ratio information, and the like.

Note here that a reception state is changed depending upon the shape of a vehicle on which digital broadcast reception device 200 is mounted or a setting position of an antenna. Therefore, when the reception quality information held in database holding unit 214 is used as reference reception quality information, and when it is used after it is converted or corrected based on the shape of a vehicle or the setting position of an antenna, more precise reception quality information can be obtained. Furthermore, when the reception quality information held in database holding unit 214 is compared with the CN ratio information, reception error information, bit error rate, and the like, which are actually received by digital broadcast reception device 200 and the reception quality information is used after it is converted or corrected, more precise reception quality information can be obtained. Furthermore, since the reception state is changed depending upon the movement speed, when the reception quality information is used after it is converted or corrected based on the movement speed, more precise reception quality information can be obtained.

As mentioned above, digital broadcast reception device 200 of the present invention has a feature that switching unit 213 calculates the antenna switching point and the hierarchy switching point, and outputs a control request signal before a reception error occurs. Before an operation based on the feature is described, for comparison, an operation of digital broadcast reception device 200 whose function is restricted so that a control request signal is not output before a reception error occurs is described. Herein, with reference to FIG. 15, the case where digital broadcast reception device 200 whose function is thus restricted moves from point A5 to point B5 is described as an example.

Firstly, function-restricted digital broadcast reception device 200 starts from point A5 in a state in which the reception is carried out by using one antenna and one station selection demodulation unit. Then, when it detects a reception error when it moves to point C5, it stops background processing and carries out switching so as to use two antennas and two station selection demodulation units. At this time, due to a reception error, a turbulence of video or a disconnection of audio occurs during viewing and listening. Then, at point D5, when it is detected that the viewing and listening can be carried out without a reception error by using one antenna and one station selection demodulation unit, one antenna and one station selection demodulation unit are assigned for background processing. Furthermore, the other antenna and the other station selection demodulation unit are used for viewing and listening broadcast. Then, a reception error is detected when the device moves to point E5, and the background processing is stopped. Then, switching is carried out so as to use two antennas and two station selection demodulation units for viewing and listening broadcast. At this time, due to a reception error, a turbulence of video or a disconnection of audio occurs during viewing and listening. Then, at point F5, when it is detected that reception can be carried out without a reception error by using one antenna and one station selection demodulation unit, one antenna and one station selection demodulation unit are assigned for a background processing, and the other antenna and the other station selection demodulation unit are used for viewing and listening broadcast. Then, the device reaches point B5. Thus, in the method in which the switching is carried out after a reception error is detected, it is not preferable because a turbulence of video or a disconnection of audio occurs during viewing and listening.

A method for detecting that viewing and listening can be carried out without a reception error by using one station selection demodulation unit in a state in which two antennas and two station selection demodulation units are used can be carried out as follows. For example, control unit 215 monitors the reception level in the station selection demodulation unit, and when the reception level becomes a level at which viewing and listening can be carried out without a reception error by using one station selection demodulation unit, the information is transmitted to switching unit 213.

Figure 16:
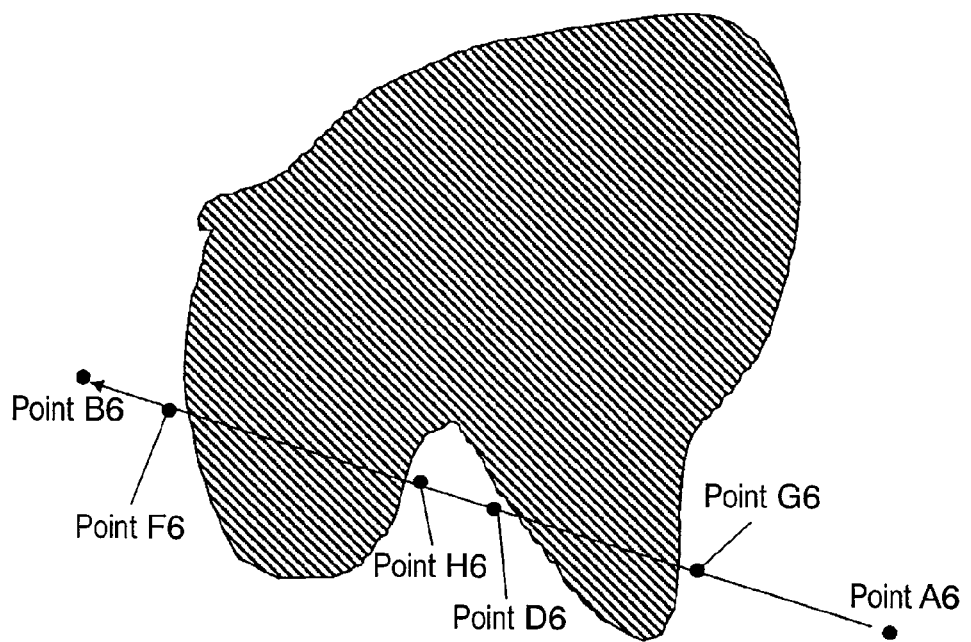
FIG. 16 is a data configuration view showing an example of reception quality information relating to a wide range held in a database holding unit in accordance with the second exemplary embodiment of the present invention.

Next, with reference to FIG. 16, digital broadcast reception device 200 is described. In this case, digital broadcast reception device 200 has a feature that a reception quality map is provided as in this exemplary embodiment, and thereby switching unit 213 outputs a control request signal before a reception error occurs. Similar to FIG. 15, FIG. 16 is a data configuration view showing one example of reception quality information relating to a wider range held in a database holding unit in accordance with this exemplary embodiment of the present invention. In the case of digital broadcast reception device 200 having a reception quality map, before digital broadcast reception device 200 moves to an area in which the reception is difficult with one antenna and one station selection demodulation unit, background processing is stopped and the reception is switched to the reception by two antennas and two station selection demodulation units. Thus, it is possible to realize digital broadcast reception device 200 in which a turbulence of video or a disconnection of audio does not occur. The operation is descried with the case where the device moves from point A6 to point B6 in FIG. 16 taken as an example.

Firstly, digital broadcast reception device 200 starts moving from point A6 in a state in which reception is carried out by using one antenna and one station selection demodulation unit for viewing and listening while background processing is carried out. Then, the device moves to point G6. At point G6, switching unit 213 detects an existence of a point on a movement route in which viewing and listening are difficult by using one antenna and one station selection demodulation unit without a reception error. Then, switching unit 213 stops background processing and outputs a control request signal so as to use two antennas and two station selection demodulation units for viewing and listening. Then, at point D6, when switching unit 213 detects that viewing and listening can be carried out without a reception error by using one antenna and one station selection demodulation unit, switching unit 213 outputs a control request signal so as to use one antenna and one station selection demodulation unit for background processing. In this way, switching is carried out so that one antenna and one station selection demodulation unit are used for viewing and listening broadcast and the other antenna and the other station selection demodulation unit are used for starting background processing. Then, at point H6, switching unit 213 detects on the movement route that viewing and listening are difficult by using one antenna and one station selection demodulation unit without a reception error. Thus, switching unit 213 stops background processing and outputs a control request signal so as to use two antennas and two station selection demodulation units for viewing and listening. Then, at point F6, switching unit 213 detects that viewing and listening can be carried out without a reception error by using one antenna and one station selection demodulation unit. Then, switching unit 213 outputs a control request signal so as to use one antenna and one station selection demodulation unit for background processing. Thus, switching is carried out so that one antenna and one station selection demodulation unit are used for viewing and listening broadcast and the other antenna and the other station selection demodulation unit are used for starting background processing.

As mentioned above, digital broadcast reception device 200 of this exemplary embodiment is operated as follows. Firstly, switching unit 213 detects an existence of a zone in which viewing and listening without a reception error by using one antenna and one station selection demodulation unit is difficult on a movement route from the reception quality information stored in database holding unit 214. Then, switching unit 213 stops background processing before the device reaches the point in which viewing and listening without a reception error by using one antenna and one station selection demodulation unit is difficult. Then, switching unit 213 outputs a control request signal so that two antennas and two station selection demodulation units are used for broadcast. The switching point may be determined in advance to be a point that is a predetermined distance, for example, 1 km before reaching a point from which viewing and listening without a reception error as mentioned above becomes difficult. That is to say, switching unit 213 outputs a control request signal at a point, which moves 1 km backward on the movement route from the point from which viewing and listening without a reception error by using one antenna and one station selection demodulation unit becomes difficult. Note here that this exemplary embodiment specifies an antenna switching point at which a control request signal is output at a predetermined distance of 1 km. The same effect can be obtained when the time information is used. In the case of time information, it is necessary to carry out calculation based on the movement speed of digital broadcast reception device 200.

Next, with reference to FIG. 17, an example of calculating an antenna switching point that is a point at which switching unit 213 switches the number of the systems of reception. When digital broadcast reception device 200 moves from, for example, point A7 to point B7 in FIG. 17, when reception is carried out by only one system at point A7, unless reception is switched to two-system reception before the device reaches point D7 from which the reception becomes impossible by on system, a reception error occurs after it passes through point D7. Then, before the device reaches point D7, it is necessary to switch the system of reception from one-system reception to two-system reception. For example, when the switching is carried out ct seconds before the device reaches a limit point, that is, point D7 in which one-system reception can be carried out, the time to reach point D7 from the current point is started to calculate from point A7. For example, when the current point is point E7 between point A7 and point D7, the distance ed, i.e., a distance between point E7 and point D7, can be calculated from a difference between a position information signal obtained from the position information detection unit and position information corresponding to reception quality information stored in database holding unit 214. Then, speed ev, i.e., a speed at point E7, can be calculated from time-related position information from the position information detection unit.

Then, by using such information, time et to reach point D7 from point E7 is calculated. Specifically, time et is a value obtained by dividing distance ed by speed ev. Then, from point A7 to point D7, the time to reach point D7 is calculated continuously or intermittently. When the calculated time to reach point D7 is identical to or shorter than time ct, switching unit 213 outputs a control request signal to synthesizing and distributing unit 205. In the case of FIG. 17, the antenna switching point is C7. Furthermore, when the two-system reception is switched to one-system reception, switching unit 213 calculates the antenna switching point by employing the same calculation method.

Next, an operation of switching unit 213 in this exemplary embodiment is described. Switching unit 213 predicts a movement route on which digital broadcast reception device 200 moves based on the position information signal from position information detection unit 211 and the movement direction information signal from movement direction detection unit 212, and reads out reception quality information corresponding to the movement route from database holding unit 214. Then, switching unit 213 detects the frequency at which antenna switching occurs in a predetermined zone on the movement route, for example, a 5-km zone. For example, in the case of the schematic view shown in FIG. 18, switching occurs at four points, i.e., C8, D8, E8 and F8. At points C8 and E8, one-system reception is switched to two-system reception. At points D8 and F8, two-system reception is switched to one-system reception.

Herein, it is assumed that digital broadcast reception device 200 of this exemplary embodiment permits three antenna switching points at maximum in a 5-km zone in advance. Therefore, switching unit 213 calculates so that antenna switching does not occur at points D8 and E8. That is to say, the antenna switching point is reduced at two points, that is, the antenna switching at point D8 from two-system reception to one-system reception and the antenna switching at point E8 from one-system reception to two-system reception are reduced. Reception is carried by one system from point A8 to point C8; reception is carried out by two systems from point C8 to point F8; and reception is carried out by one system from point from point F8 to point B8. From point D8 to point E8, reception is carried out by one system in digital broadcast reception device 200 in the above-mentioned exemplary embodiment, but in this zone, reception is carried out by two systems. Thus, in this exemplary embodiment, reception carried out by two systems in one zone of three zones in which reception can be carried out by two systems. Then, based on the calculated antenna switching point, switching unit 213 outputs an antenna switching request signal to synthesizing and distributing unit 205 when the position information signal from position information detection unit 211 is identical to the calculated antenna switching point.

As mentioned above, switching point calculation unit 109 may be operated so as to calculate antenna switching points generated in a predetermined distance ahead and to switch a part of the zones in which one-system reception can be carried to two-system reception when the number of the antenna switching points is a predetermined value or more. Since the number of the antenna switching points can be reduced in this way, digital broadcast reception device 200 capable of reducing disconnections of a video signal and an audio signal can be provided. This exemplary embodiment describes an example in which the predetermined distance is 5 km and the predetermined number of antenna switching points is three. However, the distance and the number are not particularly limited to these values. Furthermore, in this example, from point D8 to E8, one-system reception is changed to two-system reception. However, as a zone that is subjected to such a change, it is desired to select a shorter zone in the zones within a predetermined distance. Thereby, it is possible to increase the time for background processing.

In this exemplary embodiment, it is assumed that the reception point of digital broadcast receiving device 200 is stopped or is moving, and it is shown that the reception performance is changed depending upon the movement speed. That is to say, as the movement speed is faster, the reception performance is deteriorated. Thus, by using the movement speed information of digital broadcast reception device 200, more precise antenna switching can be carried out. Therefore, reception, in which a turbulence of video or a disconnection of audio does not occur, can be carried out. For example, FIG. 19 shows extracted data of one point in the reception quality information held in database holding unit 214. The data show the reception quality with respect to the movement speeds of digital broadcast reception device 200, and "o" shows a movement speed at which both one-system reception and two-system reception can be carried out; and "x" shows a movement speed at which only two-system reception can be carried out. For example, in the columns "40 km/h" and "60 km/h" in FIG. 19, data "o" are held. Therefore, it is shown that in the state in which digital broadcast reception device 200 moves up to a speed of 60 km/h, both one-system reception and two-system reception can be carried. On the other hand, in the columns "80 km/h" and "100 km/h", data "x" are held. Therefore, it is shown that in the state in which digital broadcast reception device 200 moves at a speed of 80 km/h or more, only two-system reception can be carried out. Therefore, since one-system reception cannot be carried out, it is necessary that antenna switching is carried out so as to carry out two-system reception when one-system reception cannot be carried out.

As the movement speed, when the average speed of a mobile body in a predetermined distance is used instead of using always changing movement speed, it is possible to reduce the number of correction calculation of reception quality information. Furthermore, as the movement speed, when the average speed of a mobile body in a predetermined time is used instead of using always changing movement speed, it is possible to reduce the number of correction calculation of the reception quality information.

Next, with reference to FIG. 20, an example of the reception quality information held in database holding unit 214 in a plurality of points. The data show the reception quality of each point with respect to the longitude and latitude information at respective points for each movement speed of digital broadcast reception device 200, and "o" shows a zone in which both one-system reception and two-system reception can be carried out; and "x" shows a zone in which only two-system reception can be carried out. In the data, four reception qualities are shown for each point and show the reception qualities with respect to the movement speed of digital broadcast reception device 200 at each point. In the four pieces of reception quality information at each point, "o" or "x" on the upper left part shows the reception quality when device 200 moves at a speed of 40 km/h. Furthermore, "o" or "x" on the upper right part shows the reception quality when device 200 moves at a speed of 60 km/h. Furthermore, "o" or "x" on the lower left part shows the reception quality when device 200 moves at a speed of 80 km/h, and "o" or "x" on the lower right part shows the reception quality when device 200 moves at a speed of 100 km/h.

For example, with the reference to data at 135° 35" 20' east longitude and 34° 43" 35' north latitude, the upper left data of "40 km/h" and the upper right data of "60 km/h" are denoted by "o". Therefore, it is shown that in the state in which digital broadcast reception device 200 moves up to the speed of 60 km/h, it is shown that one-system reception and two-system reception can be carried out. On the other hand, the lower left data of "80 km/h" and the lower right data of "100 km/h" are denoted by "x". Therefore, it is shown that in the state in which digital broadcast reception device 200 moves at a speed of 80 km/h or more, only two-system reception can be carried out. Therefore, since the reception cannot be carried out by only one system, it is shown to be necessary that antenna switching is carried out so as to switch the reception from one-system reception to two-system reception when one-system reception is carried.

Furthermore, for example, in the case of the movement from 135° 35" 30' east longitude and 34° 43" 45' north latitude to 135° 35" 05' east longitude and 34° 43" 45' north latitude, when the device moves at a speed of 60 km/h, the upper right data of the zone from 135° 35" 30' east longitude and 34° 43" 45' north latitude to 135° 35" 20' east longitude and 34° 43" 45' north latitude, that is, the reception quality data at a speed of 60 km/h are denoted by "o". Therefore, in this zone, it is shown that both one-system reception and two-system reception can be carried out. However, the upper right data of the zones from 135° 35" 15' east longitude and 34° 43" 45' north latitude to 135° 35" 10' east longitude and 34° 43" 45' north latitude, that is, the reception quality data at a speed of 60 km/h are denoted by "x". Therefore, in this case, it is shown that only two-system reception can be carried out. Furthermore, the upper right data of 135° 35" 05' east longitude and 34° 43" 45', that is, the reception quality data at a speed of 60 km/h are denoted by "o". Therefore, it is shown that both one-system reception and two-system reception can be carried out. That is to say, when the device moves at a speed of 60 km/h from 135° 35" 30' east longitude and 34° 43" 45' north latitude to 135° 35" 05' east longitude and 34° 43" 45' north latitude, it is shown to be necessary that antenna switching is carried out so as to carry out two-system reception when the reception is carried out by only one system from 135° 35" 20' east longitude and 34° 43" 45' north latitude to 135° 35" 15' east longitude and 34° 43" 45' north latitude. Furthermore, it is shown that antenna switching may be carried out from two-system reception to reception by only one system in the zone from 135° 35" 10' east longitude and 34° 43" 45' north latitude to 135° 35" 05' east longitude and 34° 43" 45' north latitude.

However, the case in which the device moves at a speed of 80 km/h in the same zone, that is, the zone from 135° 35" 30' east longitude and 34° 43" 45' north latitude to 135° 35" 05' east longitude and 34° 43" 45' north latitude is different from the case where the device moves at a speed of 60 km/h. That is to say, the lower left data of the zone from 135° 35" 30' east longitude and 34° 43" 45' north latitude to 135° 35" 25' east longitude and 34° 43" 45' north latitude, that is, the reception quality data at a speed of 80 km/h are denoted by "o". Therefore, in this case, it is shown that both one-system reception and two-system reception can be carried out. However, the lower left data of the zone from 135° 35" 20' east longitude and 34° 43" 45' north latitude to 135° 35" 05' east longitude and 34° 43" 45' north latitude, that is, the reception quality data at a speed of 80 km/h are denoted by "x". Therefore, in this case, it is shown that only two-system reception can be carried. That is to say, when the device moves at a speed of 80 km/h from 135° 35" 30' east longitude and 34° 43" 45' north latitude to 135° 35" 05' east longitude and 34° 43" 45' north latitude, when one-system reception is carried out from 135° 35" 25' east longitude and 34° 43" 45' north latitude to 135° 35" 20' east longitude and 34° 43" 45' north latitude, it is shown to be necessary that antenna switching is carried out so as to carry out two-system reception. Furthermore, from 135° 35" 20' east longitude and 34° 43" 45' north latitude to 135° 35" 05' east longitude and 34° 43" 45', reception cannot be carried out only by one system.

That is to say, an optimum point for antenna switching is different depending upon the movement speed. Therefore, it is desirable that the reception quality data with respect to the movement speed is held in database holding unit 214, and thereby an antenna switching point is allowed to be variable in accordance with the movement speed. As a result, it is possible to carry out reception in which a turbulence of video or a disconnection of audio does not occur during viewing and listening. That is to say, more precise antenna switching, in which the deterioration of the reception quality by the movement speed is taken into consideration, can be realized.

Note here that in this exemplary embodiment, four movement speeds are shown as an example. However, when database holding unit 214 holds more detailed reception quality information about the movement speed, more precise antenna switching can be realized.

Furthermore, in this exemplary embodiment, four movement speeds are shown as an example. However, when the speed information is subjected to an interpolation calculation based on the reception quality information held in database holding unit 214, more precise antenna switching can be realized.

Note here that the reception quality is affected by the direction of the antenna of digital broadcast reception device 200. Therefore, when the reception quality information is used after it is converted and corrected depending upon the direction of the antenna, that is, the movement direction, more precise reception quality information can be obtained.

Figure 21:
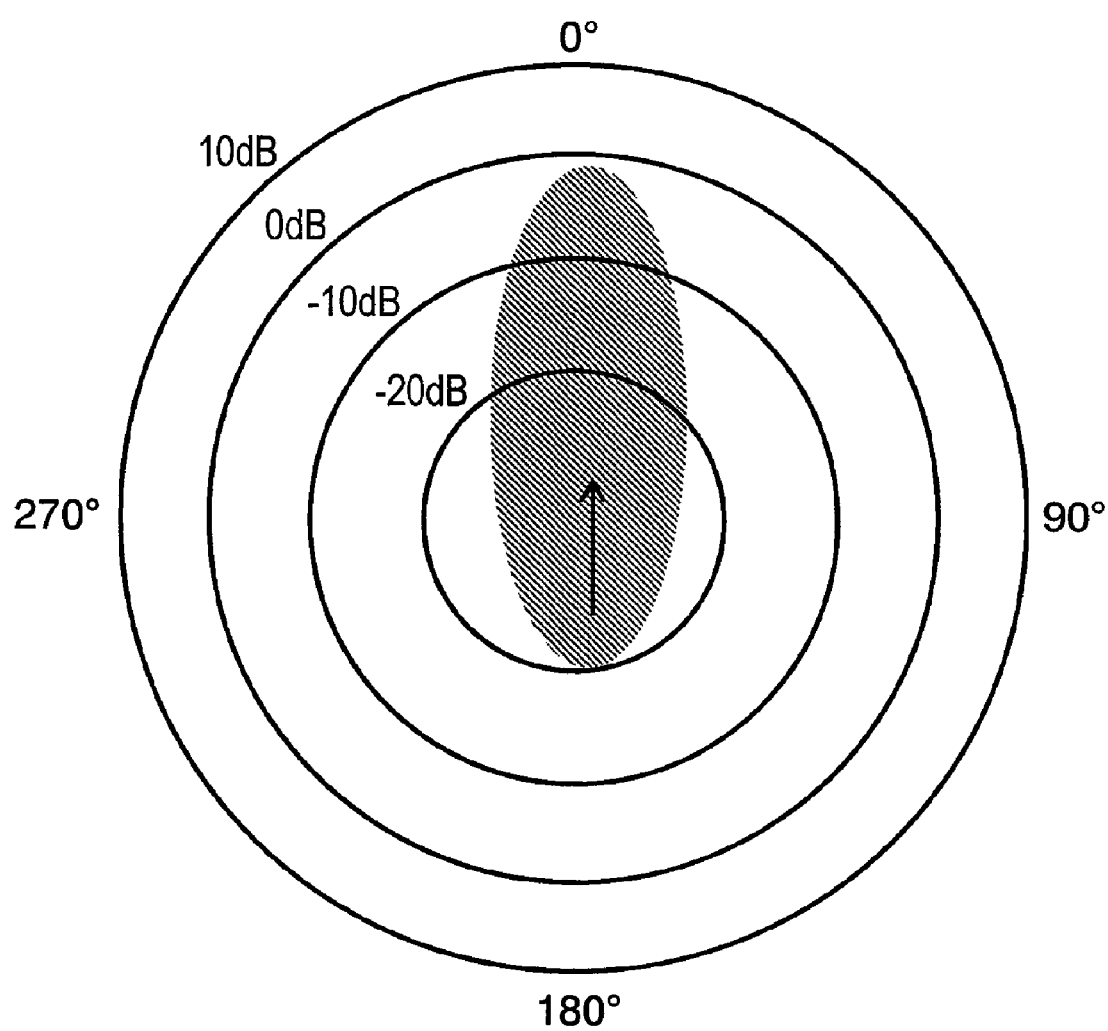
FIG. 21 is a configuration view showing an example of a reception property of an antenna in accordance with the second exemplary embodiment of the present invention.
Figure 22:
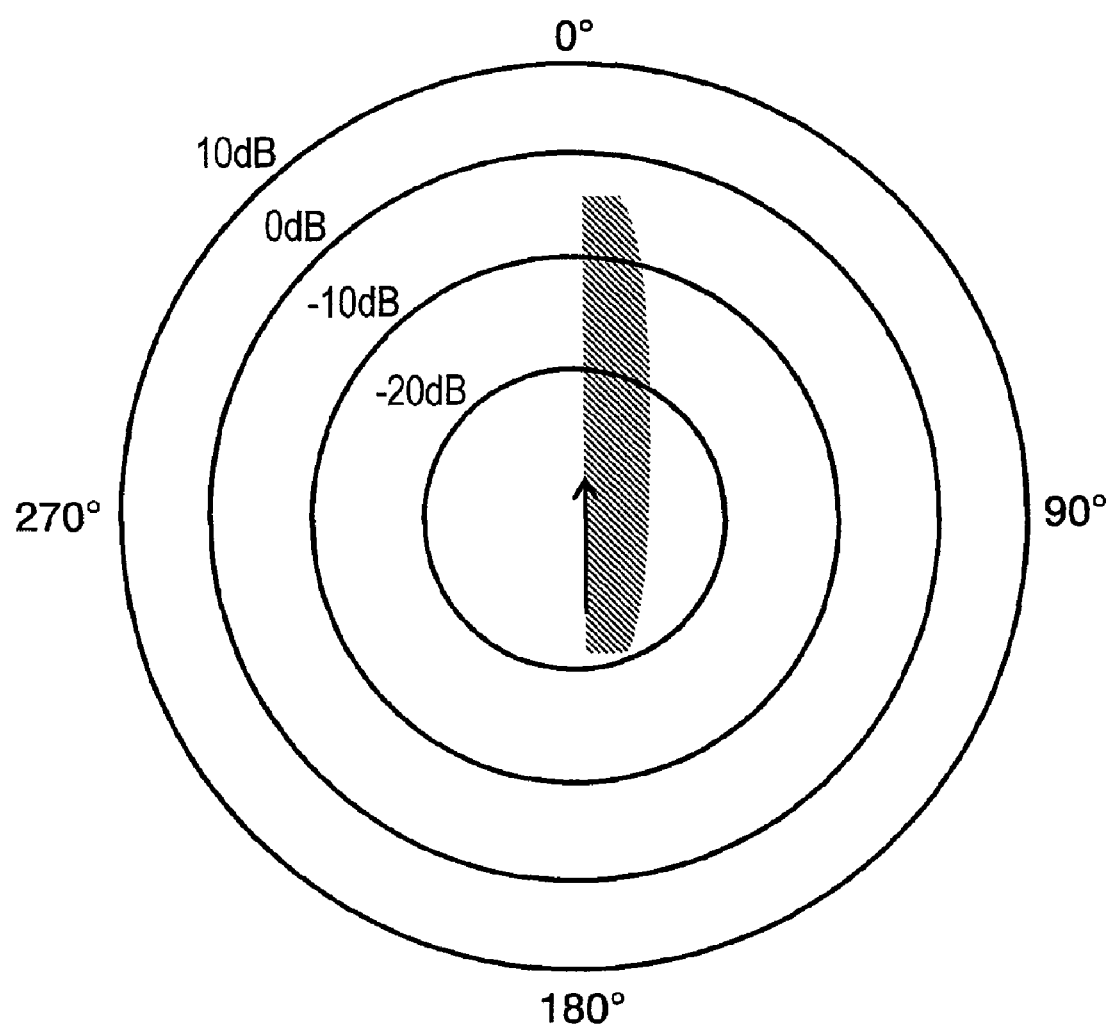
FIG. 22 is a configuration view showing an example of a receiving property of an antenna set in a mobile body main body in accordance with the second exemplary embodiment of the present invention.

For example, FIG. 21 shows an example of an antenna pattern of an antenna of a general digital broadcast reception device. This drawing shows the receiving property of an antenna and the hatched area shows a receiving sensitivity region of the antenna. As shown by an arrow of FIG. 21, 0° is defined as a movement direction of the digital broadcast reception device. As shown in this drawing, the antenna pattern is not shown by a circular shape. In the case of such an antenna, with respect to the movement direction of the mobile body, when the digital broadcast is received, the receiving sensitivity is good with respect to the reception of a radio wave coming from the direction of front 0°. However, the receiving sensitivity is bad with respect to the reception of a radio wave coming from the other directions. In particular, when a radio wave is coming from the side direction or the rear direction, the receiving sensitivity is bad. That is to say, the receiving sensitivity is changed depending upon the movement direction of the digital broadcast reception device. Furthermore, depending upon the setting position of the antenna, the antenna pattern may be in the shadow of the mobile body main body onto which a digital reception device is mounted. For example, FIG. 22 shows the antenna pattern when it is set on a mobile body main body. The hatched area shows a receiving sensitivity region of the antenna. Furthermore, as shown by an arrow of FIG. 22, 0° is defined as a movement direction of digital broadcast reception device 200. As compared with the antenna pattern shown in FIG. 21, in the antenna shown in FIG. 22, it is shown that the sensitivity of the left half of the antenna is remarkably deteriorated. In such a case, the receiving sensitivity may be further changed depending upon the direction in which a radio wave is coming.

Then, when database holding unit 214 holds the reception quality information with respect to the movement direction at each point, more precise antenna switching can be realized. FIG. 23 shows an example of the reception quality information held in database holding unit 214 at a plurality of points. The data show the reception quality with respect to the longitude and latitude information at each point for each movement direction of digital broadcast reception device 200. "o" shows a zone in which both one-system reception and two-system reception can be carried out, and "x" shows a zone in which only two-system reception can be carried out. The data show four reception qualities at each point and the reception quality with respect to the movement direction of digital broadcast reception device 200 at each point. In the four pieces of reception quality information at each point, "o" or "x" on the upper left part shows the reception quality when digital broadcast reception device 200 is moving north. Furthermore, "o" or "x" on the upper right part shows the reception quality when digital broadcast reception device 200 is moving east. Furthermore, "o" or "x" on the lower left part shows the reception quality when digital broadcast reception device 200 is moving south, and "o" or "x" on the lower right part shows the reception quality when digital broadcast reception device 200 is moving west.

For example, the data at 135° 35" 20' east longitude and 34° 43" 35' north latitude are described. The upper left data when movement direction is north and the upper right data when the movement direction is east are denoted by "o". Therefore, when digital broadcast reception device 200 is moving north or east in 135° 35" 20' east longitude and 34° 43" 35' north latitude, it is shown that both one-system reception and two-system reception can be carried out. On the other hand, when the lower left data in which the movement direction is south and the lower right data in which the movement direction is west are denoted by "x". Therefore, when digital broadcast reception device 200 is moving south or west in 135° 35" 20' east longitude and 34° 43" 35' north latitude, it is shown that only two-system reception can be carried out. In this case, since the one-system reception is impossible, when reception is carried out by one system, it is shown to be necessary that antenna switching is carried out so as to switch one-system reception to two-system reception.

Furthermore, for example, during movement from 135° 35" 30' east longitude and 34° 43" 45' north latitude to 135° 35" 05' east longitude and 34° 43" 45' north latitude, the movement direction is west. The lower right data of the zone from 135° 35" 30' east longitude and 34° 43" 45' north latitude to 135° 35" 25' east longitude and 34° 43" 45' north latitude, that is, reception quality data when the movement direction is west are denoted by "o". Therefore, in this case, it is shown that both one-system reception and two-system reception can be carried out. However, since the lower right data of the zone from 135° 35" 20' east longitude and 34° 43" 45' north latitude to 135° 35" 05' east longitude and 34° 43" 45' north latitude, that is, the reception quality data when the movement direction is west are denoted by "x". Therefore, in this case, it is shown that only two-system reception can be carried out.

In other words, in the movement to the west from 135° 35" 30' east longitude and 34° 43" 45' north latitude to 135° 35" 05' east longitude and 34° 43" 45' north latitude, when one-system reception is carried out from 135° 35" 25' east longitude and 34° 43" 45' north latitude to 135° 35" 20' east longitude and 34° 43" 45' north latitude, it is shown to be necessary that antenna switching is carried out from one-system reception to two-system reception.

However, the case in which the device moves in the opposite direction in the same zone, that is, the device moves east from 135° 35" 05' east longitude and 34° 43" 45' north latitude to 135° 35" 30' east longitude and 34° 43" 45' north latitude is different from the case in which the device moves west in the same zone. The upper right at 135° 35" 05' east longitude and 34° 43" 45' north latitude, that is, the reception quality data when the movement direction is east are denoted by "o". Therefore, in this case, it is shown that both one-system reception and two-system reception can be carried out. However, the upper right data of the zone from 135° 35" 10' east longitude and 34° 43" 45' north latitude to 135° 35" 15' east longitude and 34° 43" 45' north latitude, that is, the reception quality data when the movement direction is east is denoted by "x". Therefore, it is shown that only two-system reception can be carried out. The upper right data of the zone from 135° 35" 20' east longitude and 34° 43" 45' north latitude to 135° 35" 30' east longitude and 34° 43" 45' north latitude, that is, the reception quality data when the movement direction is east are denoted by "o". Therefore, it is shown that both one-system reception and two-system reception can be carried out.

In other words, when the device moves to the east from 135° 35" 05' east longitude and 34° 43" 45' north latitude to 135° 35" 30' east longitude and 34° 43" 45' north latitude, when reception is carried out only by one system from 135° 35" 05' east longitude and 34° 43" 45' north latitude to 135° 35" 10' east longitude and 34° 43" 45' north latitude, it is shown to be necessary that antenna switching is carried out so as to carry out two-system reception. Furthermore, it is shown that antenna switching may be carried out from two-system reception to one-system reception from 135° 35" 15' east longitude and 34° 43" 45' north latitude to 135° 35" 20' east longitude and 34° 43" 45' north latitude.

That is to say, an optimum antenna switching point is different depending upon the movement direction. Therefore, switching unit 213 may calculate the movement direction of digital broadcast reception device 200 based on the position information signal, and may operate so as to allow the antenna switching point to be variable in accordance with the movement direction. Thus, when database holding unit 214 holds the reception quality data with respect to the movement direction, more precise antenna switching in which the deterioration of the reception quality in the movement direction is taken into consideration can be realized.

Note here that in this exemplary embodiment, four movement speeds are shown as an example. However, when more detailed reception quality information about the movement direction is held in database holding unit 214, more precise antenna switching can be realized. Furthermore, in this exemplary embodiment, four movement speeds are shown as an example. However, when the movement direction is subjected to an interpolation calculation based on the reception quality information held in database holding unit 214, more precise antenna switching can be realized.

In this exemplary embodiment, switching unit 213 calculates antenna switching points generated in a predetermined distance ahead, and when the number of the antenna switching points is predetermined number or more, by restricting the antenna switching, the number of the antenna switching points is reduced. However, switching unit 213 may calculate antenna switching points generated in a predetermined time ahead, and when the number of the antenna switching points is predetermined number or more, a part of the zone in which one-system reception can be carried out may be switched to two-system reception. In this way, also by restricting the number of the antenna switching points in the predetermined time by using speed information, the same effect can be obtained.

Furthermore, in this exemplary embodiment, the reception quality information held in database holding unit 214 is always fixed. However, for example, by rewriting the data at the actually running point based on the reception quality information obtained at the time of actually running, more precise reception quality information can be obtained. Furthermore, when reception quality information at the actually running point is received from a digital broadcast reception device that moves in the opposite side or a digital broadcast reception device moving in the same direction and is rewritten into the reception quality information at each point in the reception quality information held in database holding unit 214, more precise reception quality information can be obtained.

In this exemplary embodiment, the movement direction is predicted based on the position information signal from position information detection unit 211 and the movement direction information signal from movement direction detection unit 212. However, traveling road may be acquired from a map such as a navigation system from the position information signal and the movement direction information signal, and the route of the road is used as movement route information, the same effect can be obtained.

In this exemplary embodiment, the movement direction is predicted based on the position information signal from position information detection unit 211 and the movement direction information signal from movement direction detection unit 212. However, road map information may be used together, or route information such as a navigation system and the like may be used. In such cases, the same effect can be obtained.

Furthermore, this exemplary embodiment describes a method of obtaining two systems of reception signals and synthesizing them by using two pairs of antennas and station selection demodulation units. However, when three pairs or more of antennas and station selection demodulation units are used, as a result of synthesizing received signals by a carrier diversity, reception can be carried out with a reception error further suppressed. By employing the method of this exemplary embodiment, based on the reception quality information held in database holding unit 214, more precise antenna switching can be realized.

Figure 24:
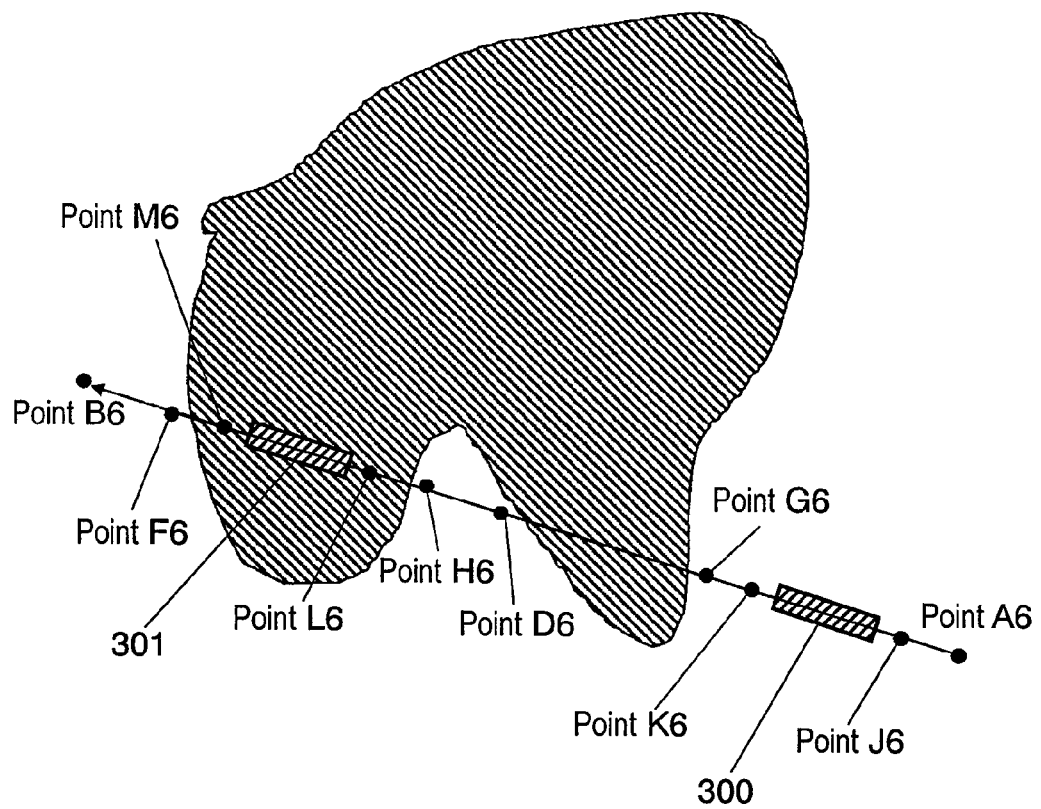
FIG. 24 is a data configuration view showing another example of reception quality information relating to a wide range held in a database holding unit in accordance with the second exemplary embodiment of the present invention.

Note here that the hierarchy switching can be carried out in the same manner as in the first exemplary embodiment. Hereinafter, with reference to FIG. 24, an example in which digital broadcast reception device 200 carries out both antenna switching and hierarchy switching is described. FIG. 24 is a data configuration view showing another example of the reception quality information. FIG. 24 is different from FIG. 16 in that tunnels 300 and 301 are present in a movement zone between point A6 to point B6. In tunnel 301, a broadcast radio wave is extremely attenuated. In this example, it is assumed that only a strong hierarchy can be received even if digital broadcast reception device 200 selects two-system reception. Furthermore, in tunnel 300, it is assumed that the broadcast radio wave is attenuated and two-system reception is required to be selected in order that digital broadcast reception device 200 receives a weak hierarchy. That is to say, because the length of the tunnel is relatively short, it is assumed that a weak hierarchy can be normally received by two-system reception although a broadcast radio wave is attenuated in the tunnel. Furthermore, it is assumed that a strong hierarchy can be received by one system. Note here that, such an environment may occur not only in tunnels 300 and 301 but also in a deep valley and the like, since a broadcast radio wave cannot reach easily. An operation of digital broadcast reception device 200 in such a situation is described in detail with a case of the movement from point A6 to point B6 in FIG. 24 as an example. Only the difference from FIG. 16 is described in detail.

Firstly, digital broadcast reception device 200 starts moving from point A6 to point J6 in a state in which reception of a weak hierarchy by one system is carried out by using one antenna and one station selection demodulation unit for viewing and listening while background processing is carried out. At this time, it is assumed that another system is used for background processing. At point J6, switching unit 213 detects an existence of a point in which viewing and listening of a weak hierarchy without a reception error is difficult by one-system reception on a movement route. Then, switching unit 213 stops background processing and outputs a control request signal so as to use two antennas and two station selection demodulation units for viewing and listening. In this case, since a weak hierarchy can be received, it is not necessary to output a control request signal so as to receive a strong hierarchy. Since a weak hierarchy has higher resolution of a video signal, it is desirable to receive a weak hierarchy if possible. As a result, switching is carried out so that a signal of a weak hierarchy is received by two systems. That is to say, point J6 is an antenna switching point.

At point K6, when switching unit 213 detects that viewing and listening can be carried out without a reception error by using one antenna and one station selection demodulation unit, it outputs a control request signal so as to use one antenna and one station selection demodulation unit for background processing. In this way, switching is carried out so that one antenna and one station selection demodulation unit are used for viewing and listening broadcast and the other antenna and the other station selection demodulation unit are used for starting background processing. As a result, switching is carried out so that a signal of a weak hierarchy is received by one system. That is to say, point K6 is an antenna switching point. In this case, since a weak hierarchy can be received, it is not necessary to output a control request signal so as to receive a strong hierarchy. Since a weak hierarchy has higher resolution of a video signal, it is desirable to receive a weak hierarchy if possible.

Then, at point L6, switching unit 213 detects that, on the movement route, it is difficult to receive a weak hierarchy without a reception error even if two-system reception is carried out. Thus, switching unit 213 outputs a control request signal so as to receive a strong hierarchy. That is to say, point L6 is a hierarchy switching point. Then, after further movement, at point M6, switching unit 213 detects that a weak hierarchy can be received without a reception error by two systems. Thus, switching unit 213 outputs a control request signal so as to receive a weak hierarchy. That is to say, point M6 is a hierarchy switching point.

In this way, antenna switching and hierarchy switching can be carried out approximately in accordance with the reception situation in each stage from a reception state in which a weak hierarchy is received by one-system reception and background processing is carried out by using the other antenna and the other station selection demodulation unit to a reception state in which viewing and listening of signals of a weak hierarchy and a strong hierarchy are carried out by two-system reception. That is to say, when switching unit 213 detects that the reception environment is deteriorated in accordance with the movement and a reception error occurs, when a weak hierarchy is received by one system, before a reception error occurs, switching unit 213 outputs an antenna switching request signal in preference to a hierarchy switching request signal. Furthermore, when switching unit 213 detects that the reception environment is improved in accordance with the movement and that a reception error does not occur by a hierarchy switching, when a strong hierarchy is received by two systems, switching unit 213 outputs a hierarchy switching request signal in preference to an antenna switching request signal. As a result, since a zone receiving a strong hierarchy can be reduced, a time for continuing the reception of a high-definition video signal can be increased.

Figure 25:
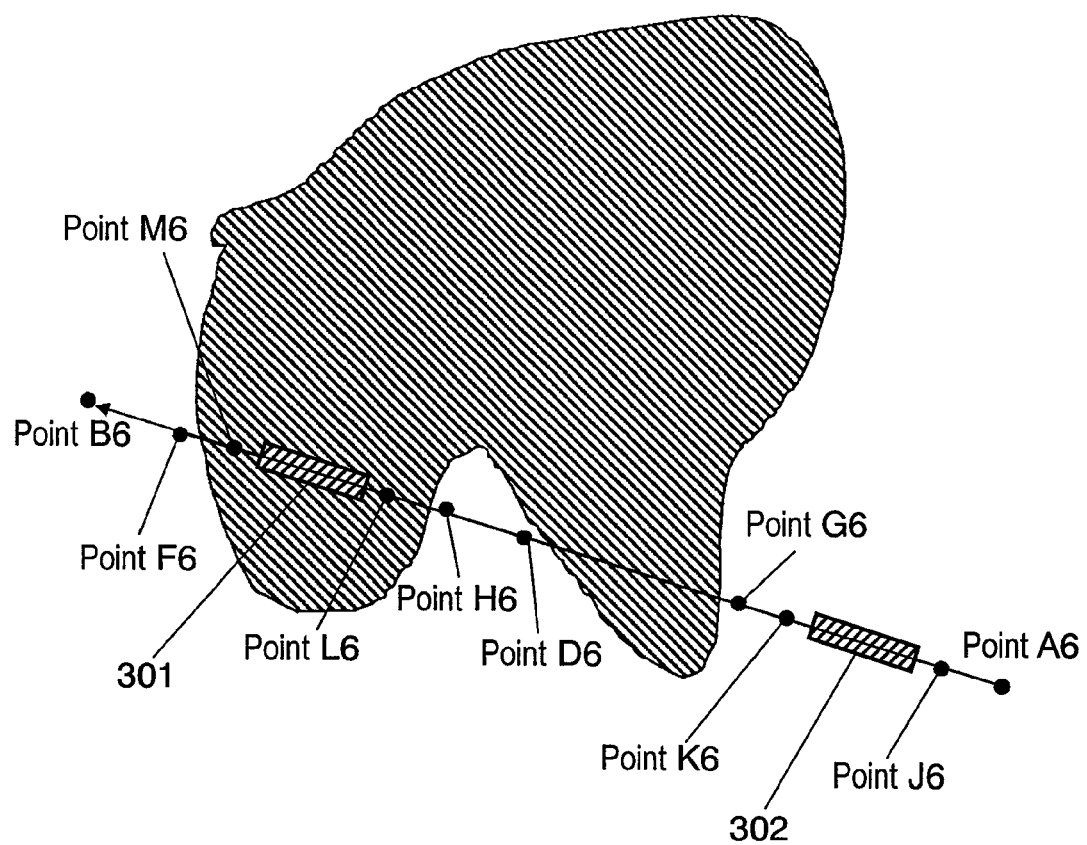
FIG. 25 is a data configuration view showing a further example of reception quality information relating to a wide range held in a database holding unit in accordance with the second exemplary embodiment of the present invention.
Figure 26:
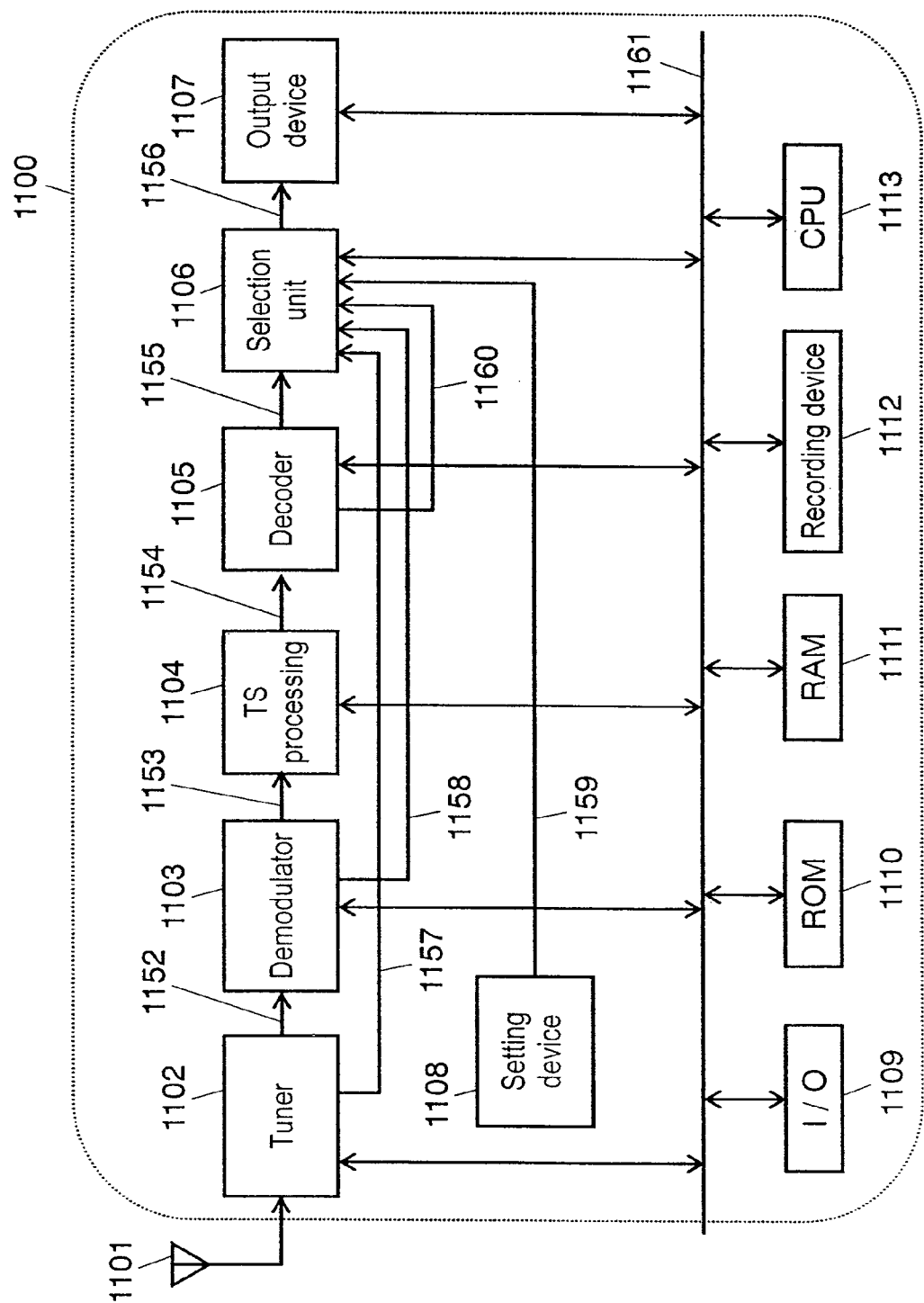
FIG. 26 is a block diagram showing a configuration of a conventional digital broadcast reception device.

Next, another example of the case in which digital broadcast reception device 200 of this exemplary embodiment uses both antenna switching and hierarchy switching is described with reference to FIG. 25. FIG. 25 is a data configuration view showing a further example of reception quality information. FIG. 25 is different from FIG. 24 in that it is assumed that a broadcast radio wave is extremely attenuated in tunnel 302 and, for example, even if digital broadcast reception device 200 selects two-system reception, only a strong hierarchy can be received. An operation of digital broadcast reception device 200 in such a situation is described in detail by taking a case in which the device moves from point A6 to point B6 as an example. Only the difference from FIG. 24 is described in detail.

Firstly, digital broadcast reception device 200 starts moving from point A6 to point J6 in a state in which it receives a weak hierarchy by one system by using one antenna and one station selection demodulation unit for viewing and listening while background processing is carried out. At this time, the other system is used for background processing. At point J6, switching unit 213 detects an existence of a point on the movement route in which the reception of a weak hierarchy is difficult without a reception error by one system. Then, switching unit 213 stops the background processing and uses two antennas and two station selection demodulation units for viewing and listening, and outputs a control request signal so as to receive a strong hierarchy. As a result, switching is carried out so that a strong hierarchy is received by two systems. That is to say, point J6 is an antenna switching point and a hierarchy switching point. At point K6, when switching unit 213 detects that viewing and listening can be carried out without a reception error by using one antenna and one station selection demodulation unit, outputs a control request signal so that one antenna and one station selection demodulation unit are used for background processing and a weak hierarchy is received. As a result, antenna switching is carried so that one antenna and one station selection demodulation unit are used for viewing and listening broadcast and the other antenna and the other station selection demodulation unit are used for starting background processing, and switching is carried out so that a weak hierarchy is received. That is to say, point K6 is an antenna switching point and a hierarchy switching point.

Note here that since the movement route later on is the same as in the example mentioned above, the detailed description is omitted.

In this way, antenna switching and hierarchy switching can be appropriately carried out in accordance with each stage of reception situation from a reception state in which a weak hierarchy is received by one system and background processing is carried out by using the other antenna and the other station selection demodulation unit to a reception state in which viewing and listening of a signal of a weak hierarchy and a strong hierarchy are carried out by using two systems. That is to say, switching unit 213 may control synthesizing and distributing unit 205 so as to output the antenna switching request signal and the hierarchy switching request signal simultaneously based on the reception quality information, the movement direction information signal and the position information signal. Thus, it is possible to carry out reception in which a turbulence of video or a disconnection of audio does not occur.

INDUSTRIAL APPLICABILITY

A digital broadcast reception device in accordance with the present invention can be used in a mobile body including a vehicle and a railroad train traveling in an area capable of receiving digital broadcast.

The invention claimed is:

1. A digital broadcast reception device comprising:
a broadcast wave reception antenna for receiving a broadcast signal;
a station selection demodulation unit for selecting and demodulating the broadcast signal received by the broadcast wave reception antenna as a plurality of demodulated signals, and distributing and outputting a signal for each hierarchy;
a first decoder for decoding one signal of the plurality of demodulated signals output from the station selection demodulation unit;
a second decoder for decoding another signal of the plurality of demodulated signals output from the station selection demodulation unit;
an output switcher for switching and outputting the signals output from the first decoder and the second decoder;
a position information detector for detecting position information and outputting a position information signal;
a movement direction detector for detecting a movement direction of the digital broadcast reception device based on the position information signal output from the position information detector and outputting a movement direction information signal;
a database holder for holding reception quality information in which the position information signal is related to reception quality at a corresponding position; and
a switching point calculator for calculating a hierarchy switching point at which the hierarchy to be received is switched based on the position information signal output from the position information detector, the movement direction information signal output from the movement direction detector and the reception quality information stored in the database holder, and outputting a hierarchy switching request signal to the output switcher,
wherein the switching point calculator controls the output switcher based on the reception quality information, the movement direction information signal and the position information signal, and calculates a movement speed of the digital broadcast reception device based on the position information signal, and allows the hierarchy switching point to be variable in accordance with the movement speed.

2. The digital broadcast reception device of claim 1, wherein the switching point calculator outputs the hierarchy switching request signal before a reception error occurs.

3. The digital broadcast reception device of claim 1, wherein the switching point calculator calculates the number of the hierarchy switching points generated in a predetermined time ahead, and switches reception in a part of a zone, in which reception of a weak hierarchy can be carried out, to reception of a strong hierarchy when the number of the hierarchy switching points is equal to or more than a predetermined number.

4. The digital broadcast reception device of claim 3, wherein the switching point calculator calculates the movement direction of the digital broadcast reception device based on the position information signal, and allows the hierarchy switching point to be variable in accordance with the movement direction.

5. The digital broadcast reception device of claim 1, wherein the switching point calculator calculates the number of the hierarchy switching points generated in a predetermined distance ahead, and switches reception in a part of a zone, in which reception in a weak hierarchy can be carried out, to reception in a strong hierarchy when the number of the hierarchy switching points is equal to or more than a predetermined number.

6. The digital broadcast reception device of claim 5, wherein the switching point calculator calculates the movement direction of the digital broadcast reception device based on the position information signal, and allows the hierarchy switching point to be variable in accordance with the movement direction.

7. The digital broadcast reception device of claim 1 further comprising a reference position information reception antenna for receiving a reference position information signal including the position information;
wherein the position information detector detects the position information based on the reference position information signal received by the reference position information reception antenna.

8. A digital broadcast reception device comprising:
a plurality of broadcast wave reception antennas for receiving broadcast signals;
a plurality of station selection demodulators, selecting and demodulating the broadcast signals received by the plurality of broadcast wave reception antennas;
a synthesizer and distributor for synthesizing and distributing the plurality of demodulated signals output from the plurality of station selection demodulators;
a first transport decoder for transport decoding one signal of the plurality of distributed signals output from the synthesizer and distributor;
a second transport decoder for transport decoding another signal of the plurality of distributed signals output from the synthesizer and distributor;
an AV (audio/video) decoder for decoding the transport decoded signal output from the first transport decoder;
a position information detector for detecting position information and outputting a position information signal;
a movement direction detector for detecting a movement direction of the digital broadcast reception device based on the position information signal output from the position information detector and outputting a movement direction information signal;
a database holder for holding reception quality information in which the position information signal is related to reception quality at a corresponding position; and
a switcher for calculating an antenna switching point and a hierarchy switching point based on the position information signal output from the position information detector, the movement direction information signal output from the movement direction detector and the reception quality information stored in the database holder, and outputting a control request signal including at least an antenna switching request signal or a hierarchy switching request signal to the synthesizer and distributor;
wherein the switcher controls the synthesizer and distributor based on the signal quality information, the movement direction information signal and the position information signal.

9. The digital broadcast reception device of claim 8, wherein the switcher outputs the control request signal before a reception error occurs.

10. The digital broadcast reception device of claim 9, wherein the switcher outputs the antenna switching request signal in preference to the hierarchy switching request signal when it detects that a reception environment is deteriorated and the reception error occurs in accordance with movement in a state in which reception of a weak hierarchy is carried out by one system; and outputs the hierarchy switching request signal in preference to the antenna switching request signal when it detects that the reception environment is improved and the reception error does not occur in accordance with movement in a state in which reception of a strong hierarchy is carried out by two systems.

11. The digital broadcast reception device of claim 9, wherein the switcher outputs the antenna switching request signal and the hierarchy switching request signal simultaneously.

12. The digital broadcast reception device of claim 8, wherein the switcher calculates the antenna switching points generated in a predetermined time ahead, and switches reception in a part of a zone, in which reception by one system can be carried out, to reception by two systems when the number of the antenna switching points is equal to or more than a predetermined number.

13. The digital broadcast reception device of claim 12, wherein the switcher calculates a movement speed of the digital broadcast reception device based on the position information signal, and allows at least the antenna switching point or the hierarchy switching point to be variable in accordance with the movement speed.

14. The digital broadcast reception device of claim 12, wherein the switcher calculates the movement direction of the digital broadcast reception device based on the position information signal, and allows the antenna switching point to be variable in accordance with the movement direction.

15. The digital broadcast reception device of claim 8, wherein the switcher calculates the antenna switching points generated in a predetermined distance ahead, and switches reception in a part of a zone, in which reception by one system can be carried out, to reception by two systems when the number of the antenna switching points equal to or more than a predetermined number.

16. The digital broadcast reception device of claim 15, wherein the switcher calculates a movement speed of the digital broadcast reception device based on the position information signal, and allows at least the antenna switching point or the hierarchy switching point to be variable in accordance with the movement speed.

17. The digital broadcast reception device of claim 15, wherein the switcher calculates the movement direction of the digital broadcast reception device based on the position information signal, and allows the antenna switching point to be variable in accordance with the movement direction.

18. The digital broadcast reception device of claim 8, further comprising a reference position information reception antenna for receiving a reference position information signal including the position information;

wherein the position information detector detects the position information based on the reference position information signal received by the reference position information reception antenna.

* * * * *

UNITED STATES PATENT AND TRADEMARK OFFICE
CERTIFICATE OF CORRECTION

PATENT NO. : 8,194,795 B2  
APPLICATION NO. : 12/159240  
DATED : June 5, 2012  
INVENTOR(S) : Kohsuke Yamamoto et al.

Page 1 of 1

It is certified that error appears in the above-identified patent and that said Letters Patent is hereby corrected as shown below:

IN THE CLAIMS:

Column 35  
At claim 1, line 10, please replace "demodulation unit for" with -- demodulator, --.

Column 35  
At claim 1, line 17, please replace "demodulation unit" with -- demodulator --.

Column 35  
At claim 1, line 20, please replace "demodulation unit" with -- demodulator --.

Signed and Sealed this  
Seventh Day of August, 2012

David J. Kappos  
*Director of the United States Patent and Trademark Office*